United States Patent
Horn et al.

(10) Patent No.: US 12,388,187 B2
(45) Date of Patent: Aug. 12, 2025

(54) LENS COMMUNICATION WITH MULTIPLE ANTENNA ARRAYS

(71) Applicant: QUALCOMM Incorporated, San Diego, CA (US)

(72) Inventors: Idan Michael Horn, Hod Hasharon (IL); Yehonatan Dallal, Kfar Saba (IL); Shay Landis, Hod Hasharon (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 19 days.

(21) Appl. No.: 18/485,166

(22) Filed: Oct. 11, 2023

(65) Prior Publication Data

US 2024/0039167 A1    Feb. 1, 2024

Related U.S. Application Data

(63) Continuation of application No. 17/349,633, filed on Jun. 16, 2021, now Pat. No. 11,817,626.

(51) Int. Cl.
   *H01Q 15/02*    (2006.01)
   *H01Q 19/06*    (2006.01)
   *H01Q 21/00*    (2006.01)

(52) U.S. Cl.
   CPC .......... *H01Q 15/02* (2013.01); *H01Q 21/00* (2013.01)

(58) Field of Classification Search
   CPC .... G01R 29/08; G01R 29/0821; G01R 29/10; G01R 29/105; H01Q 13/06; H01Q 13/065; H01Q 19/08; H01Q 19/13; H01Q 19/132; H01Q 15/02; H01Q 19/06; H01Q 19/062; H01Q 21/00; H01Q 21/29; H01Q 25/00;
   (Continued)

(56) References Cited

U.S. PATENT DOCUMENTS 3,530,475 A * 9/1970 Danielson ................ H01Q 3/46
                                                      342/368
3,999,182 A * 12/1976 Moeller .................... H01Q 3/34
                                                      342/372
(Continued)

OTHER PUBLICATIONS

International Search Report and Written Opinion—PCT/US2022/030117—ISA/EPO—Sep. 5, 2022 (2100310WO).
(Continued)

*Primary Examiner* — Tho G Phan
(74) *Attorney, Agent, or Firm* — Holland & Hart LLP/QUALCOMM Incorporated

(57) ABSTRACT

Methods, systems, and devices for wireless communications are described. A communications device may transmit a first signal. The first signal may be transmitted from a first antenna array of the communications device through a lens of the communications device in a direction. An energy of a portion of the first signal may be below a threshold based on a position of a second antenna array of the communications device. The portion of the first signal may correspond to a portion of a reflection of the first signal that overlaps with the position of the second antenna array. The communications device may concurrently receive, at the second antenna array, a second signal originating from another direction, where the second signal may be focused in the direction of the second antenna array based on the lens.

30 Claims, 14 Drawing Sheets

(58) Field of Classification Search
CPC ...... H01Q 25/008; H01Q 3/26; H01Q 3/2611; H04L 5/14; H04L 5/1423; H04B 7/00; H04B 7/005
See application file for complete search history.

(56) References Cited

U.S. PATENT DOCUMENTS

| | | | |
|---|---|---|---|
| 4,268,831 | A | 5/1981 | Valentino et al. |
| 8,031,129 | B2* | 10/2011 | Shtrom .................. H01Q 19/24 |
| | | | 343/893 |
| 8,760,354 | B2 | 6/2014 | Clymer et al. |
| 9,716,319 | B2* | 7/2017 | Caratelli .................. H01Q 1/48 |
| 10,199,739 | B2 | 2/2019 | Matitsine et al. |
| 10,693,210 | B2* | 6/2020 | Chattopadhyay ...... H01Q 15/08 |
| 10,938,124 | B2* | 3/2021 | Boutayeb ............. H01Q 25/008 |
| 11,450,971 | B2 | 9/2022 | Kucera et al. |
| 11,764,480 | B2* | 9/2023 | Dallal .................. H04B 17/336 |
| | | | 343/702 |
| 11,962,089 | B2* | 4/2024 | Rausch .................. H01Q 1/525 |
| 2013/0114468 | A1 | 5/2013 | Hui et al. |
| 2017/0125913 | A1 | 5/2017 | Ling |
| 2020/0212590 | A1 | 7/2020 | Rofougaran et al. |
| 2022/0059935 | A1 | 2/2022 | Zhang et al. |
| 2022/0140492 | A1 | 5/2022 | Huggers et al. |
| 2022/0407238 | A1 | 12/2022 | Horn et al. |

OTHER PUBLICATIONS

Kwon T., et al., "RF Lens-Embedded Massive MIMO Systems: Fabrication Issues and Codebook Design", IEEE Transactions on Microwave Theory and Techniques, vol. 64, No. 7, Jul. 2016, pp. 2256-2271.

* cited by examiner

LENS COMMUNICATION WITH MULTIPLE ANTENNA ARRAYS

RELATED APPLICATIONS

This application is a continuation of U.S. patent application Ser. No. 17/349,633, by Horn et al, entitled "LENS COMMUNICATION WITH MULTIPLE ANTENNA ARRAYS," filed Jun. 16, 2021, which assigned to the assignee hereof, and expressly incorporated by reference herein.

INTRODUCTION

The following relates to wireless communications, including managing communications associated with a lens.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communications devices, which may be otherwise known as user equipment (UE).

SUMMARY

A method for wireless communication at a first communications device is described. The method may include transmitting, from a first antenna array of the first communications device, a first signal through a lens of the first communications device in a direction of a second communications device, an energy of a portion of the first signal being below a threshold, where a position of the portion of the first signal is based on a position of a second antenna array of the first communications device. The method may also include receiving, at the second antenna array and at least in part concurrently with transmitting the first signal, a second signal from a third communications device, the second signal being focused in a direction of the second antenna array based on the lens.

An apparatus for wireless communication at a first communications device is described. The apparatus may include a processor and memory coupled to the processor, the processor and memory configured to transmit, from a first antenna array and through a lens, a first signal in a direction of a second communications device, an energy of a portion of the first signal being below a threshold, and a position of the portion of the first signal based at least in part on a position of a second antenna array. The processor and memory may be further configured to receive, at the second antenna array and at least in part concurrently with transmitting the first signal, a second signal from a third communications device, the second signal being focused in a direction of the second antenna array based at least in part on the lens.

Another apparatus for wireless communication at a first communications device is described. The apparatus may include means for transmitting, from a first antenna array of the first communications device, a first signal through a lens of the first communications device in a direction of a second communications device, an energy of a portion of the first signal being below a threshold, where a position of the portion of the first signal is based on a position of a second antenna array of the first communications device. The apparatus may include means for receiving, at the second antenna array and at least in part concurrently with transmitting the first signal, a second signal from a third communications device, the second signal being focused in a direction of the second antenna array based on the lens.

A non-transitory computer-readable medium storing code for wireless communication at a first communications device is described. The code may include instructions executable by a processor to transmit, from a first antenna array of the first communications device, a first signal through a lens of the first communications device in a direction of a second communications device, an energy of a portion of the first signal being below a threshold, where a position of the portion of the first signal is based on a position of a second antenna array of the first communications device. The code may include instructions executable by a processor to receive, at the second antenna array and at least in part concurrently with transmitting the first signal, a second signal from a third communications device, the second signal being focused in a direction of the second antenna array based on the lens.

In some examples of the method, apparatuses, and non-transitory computer-readable medium described herein, a reflection of the first signal occurs based on transmitting the first signal through the lens, a portion of the reflection corresponding to the portion of the first signal and overlapping with the second antenna array, and an energy of the portion of the reflection being below a second threshold.

Some examples of the method, apparatuses, and non-transitory computer-readable medium described herein may further include operations, features, means, or instructions for determining beam coefficients for the first antenna array based on, compared to the lens, the position of the second antenna array and a position of the first antenna array, where the portion of the first signal corresponds to a portion of a reflection of the first signal that overlaps with the second antenna array based on the beam coefficients and applying the beam coefficients to a data signal received at the first antenna array to form the first signal.

In some examples of the method, apparatuses, and non-transitory computer-readable medium described herein, determining the beam coefficients may include operations, features, means, or instructions for determining the beam coefficients for the first antenna array based on a position of the second communications device, where the first signal may be focused in the direction of the second communications device based on the beam coefficients and the lens.

Some examples of the method, apparatuses, and non-transitory computer-readable medium described herein may further include operations, features, means, or instructions for selecting, from a set of multiple antenna arrays of the first communications device, the first antenna array for transmitting the first signal to the second communications device based on a position of the second communications device and selecting, from the set of multiple antenna arrays, the second antenna array for receiving signals from the third communications device based on a position of the third communications device and a position of the first antenna array compared to the second antenna array.

Some examples of the method, apparatuses, and non-transitory computer-readable medium described herein may further include operations, features, means, or instructions for disabling a subset of the set of multiple antenna arrays based on the position of the second communications device and the third communications device.

Some examples of the method, apparatuses, and non-transitory computer-readable medium described herein may further include operations, features, means, or instructions for transmitting, from the first antenna array and a third antenna array of the first communications device, a third signal to a fourth communications device, where a mode associated with nulling a portion of transmissions from the first communications device may be disabled based on, compared to the position of the second antenna array, a position of the third antenna array and a position of the first antenna array, establishing a connection with the second communications device, and activating the mode based on a position of the second communications device compared to the third communications device, the first signal being transmitted from the first antenna array based on activating the mode.

Some examples of the method, apparatuses, and non-transitory computer-readable medium described herein may further include operations, features, means, or instructions for determining beam coefficients for the second antenna array based on a reflection of the first signal, where the beam coefficients cancel interference caused by the reflection of the first signal and applying the beam coefficients to the second signal received at the second antenna array.

In some examples of the method, apparatuses, and non-transitory computer-readable medium described herein, a distance between the lens and a set of multiple antenna arrays of the first communications device may be based on a wavelength of the first signal and a diameter of the set of multiple antenna arrays, the set of multiple antenna arrays including the first antenna array and the second antenna array.

In some examples of the method, apparatuses, and non-transitory computer-readable medium described herein, a diameter of the lens may be greater than the diameter of the set of multiple antenna arrays.

In some examples of the method, apparatuses, and non-transitory computer-readable medium described herein, a frequency of the first signal exceeds a frequency threshold associated with a distance between the first antenna array and the lens.

In some examples, the apparatus including the processor and memory may further include the lens and a plurality of memory arrays coupled with the lens and including the first antenna array and the second antenna array.

DETAILED DESCRIPTION

Figure 1:
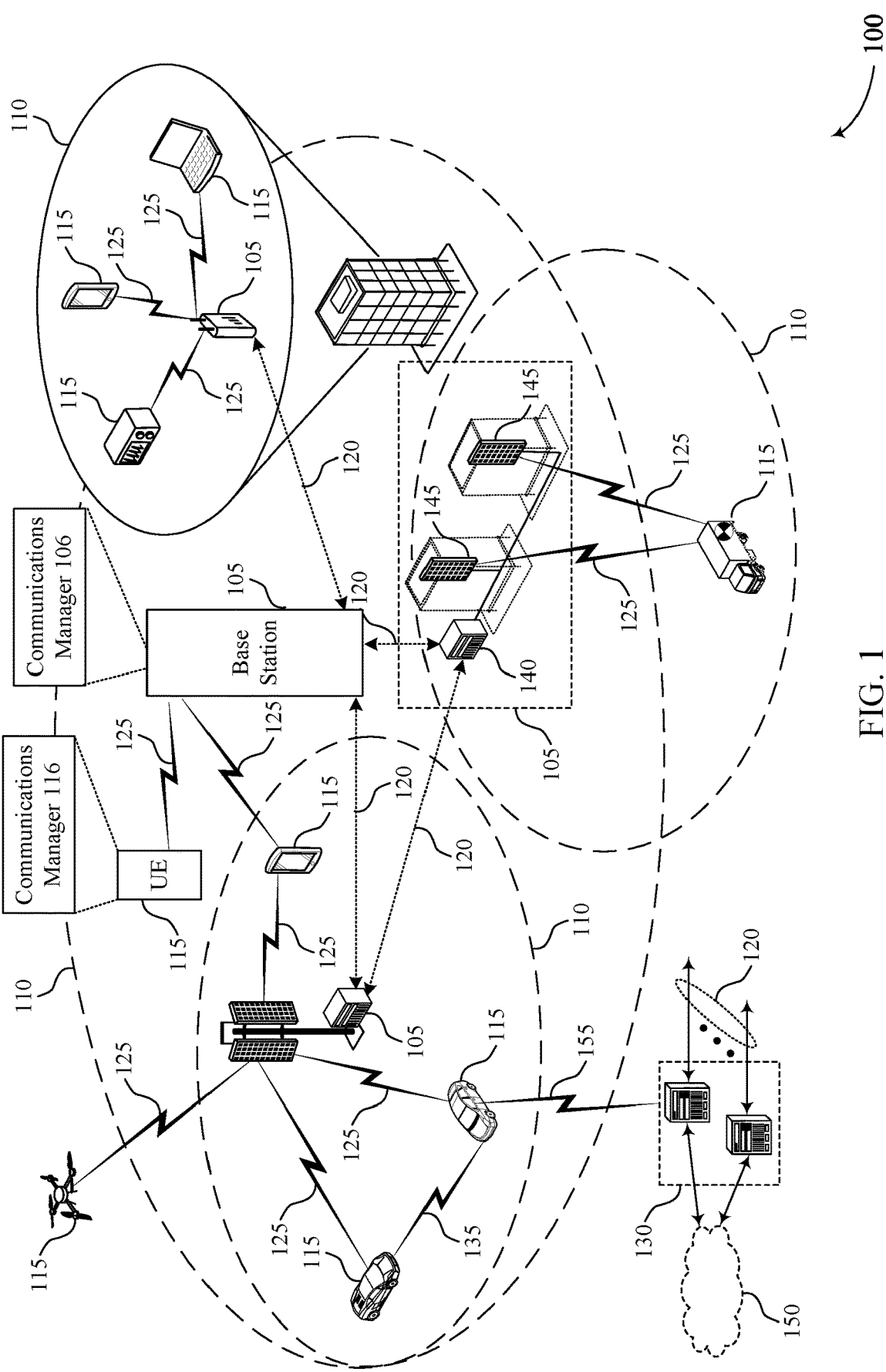
FIG. 1 illustrates an example of a wireless communications system that supports lens communication with multiple antenna arrays in accordance with aspects of the present disclosure.

Beamformed communications may be used to enable full duplex communications between communications devices—full duplex communications may refer to simultaneous uplink and downlink communications that occur over shared time and frequency resources. That is, beamforming techniques may be used to form beams that use common time and frequency resources and that each correspond to different (e.g., orthogonal) spatial layers. In some examples, an uplink transmission may be performed over a one of the beams and a downlink transmission may be performed over another of the beams. In some examples, a device uses a unified linear array to form one or more beams. A unified linear array may include one or more antenna arrays (that each include multiple antennas that are coupled with multiple phase shifters), where phase shifters may be used in combination with the antennas of an antenna array to form a beam. In some examples, a cost, complexity, power consumption, or any combination thereof, associated with a unified linear array may increase as a quantity of antenna array, antennas, phase shifters, or any combination thereof, increases.

In other examples, a device may use a lens loaded antenna to form one or more beams. The lens loaded antenna may include one or more antennas coupled with a lens, where one or more beams may be formed by exciting antennas at certain positions compared to a focal point of the lens. In some examples, compared to a unified linear array, a lens loaded antenna is associated with a lower cost, complexity, power consumption, or any combination thereof—e.g., based on the lens loaded antenna not including any phase shifters.

Though a lens loaded antenna may be used to form beams with lower cost, complexity, power consumption, or any combination thereof, than a unified linear array, a lens loaded antenna may experience an increased amount of self-interference compared to the unified linear array. In some examples, reflections of signals transmitted from one or more antennas through a lens may be detected at one or more other antennas coupled with the lens and configured to receive signals.

Accordingly, to form beams with more cost-efficiency, simplicity, and power efficiency than a unified linear array and with less enhanced interference characteristics than a lens loaded antenna, an enhanced beamforming configuration may be used. The enhanced beamforming configuration may include a lens that is coupled with sets of antenna arrays (rather than antennas), where the antenna arrays may include antennas that are coupled with phase shifters. In some examples, at least one of the antenna arrays includes multiple antennas. In some examples, a first communications device includes a set of antenna arrays and a lens. The first communications device may transmit, from an antenna array that is in a first position compared to the lens, a downlink signal to another communications device through the lens, and the lens may focus the downlink signal in the direction of the second communications device.

The enhanced beamforming configuration may also be configured to reduce the interference caused by transmissions from one antenna array to other antenna arrays. To prevent the antenna array that transmits the downlink signal from cause interference to antenna arrays that are in other positions compared to the lens, the downlink signal may be formed (e.g., using a set of phase shifters) so that an energy of a portion of the downlink signal is below a threshold. The reduced-energy portion of the downlink signal may be based on a position of a second antenna array compared to first antenna array and the lens. The first communications device may concurrently (e.g., during completely or partially overlapping time periods) receive, at the second antenna array, an uplink signal from a third communications device, where the lens may focus the second signal in the direction of the antenna array.

By forming the downlink signal with a reduced-energy portion, an energy of a corresponding portion in a reflection of the downlink signal may also be below a threshold (e.g., the same or a different threshold). Also, by forming the reduced-energy portion based on a position of the second antenna array, the corresponding portion of the reflection may be aligned with (e.g., overlap with a position of) the second antenna array. Thus, interference to the second antenna array caused by the reflection of the downlink signal may be reduced, and signal characteristics (e.g., signal-to-interference-to-noise ratio (SINR)) of the uplink signal received at the second antenna array may be improved. By increasing a signal quality of signals received at the second antenna array, full-duplex operations may be better supported and a quantity of transmission failures may be decreased, increasing a throughput of a radio access network.

Aspects of the disclosure are initially described in the context of wireless communications systems. Aspects of the disclosure are also described in the context of a process flow. Aspects of the disclosure are further illustrated by and described with reference to apparatus diagrams, system diagrams, and flowcharts that relate to lens communication with multiple antenna arrays.

FIG. 1 illustrates an example of a wireless communications system 100 that supports lens communication with multiple antenna arrays in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peerto-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antennas of an antenna array such that some signals propagating at particular orientations with respect to an antenna array experience constructive interference while others experience destructive interference. The adjustment of signals communicated via the antennas may include a transmitting device or a receiving device applying amplitude offsets, phase offsets, or both to signals carried via the antennas associated with the device. The adjustments associated with each of the antennas may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antennas of an antenna array, or by processing received signals according to different receive beamforming weight sets applied to signals received at multiple antennas of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

To increase a utilization of wireless communication resources, a radio network may be configured to support full duplex communications. Full duplex communications may refer to simultaneous uplink and downlink communications that are performed over shared frequency resources. In some examples, spatial-multiplexing is used to enable full duplex communications, where each spatial layer may be orthogonal to and associated with a different direction than the other spatial layers.

Beamforming techniques may be used to achieve the spatial layers by forming multiple beams (e.g., transmit and receive beams) in different directions. Each beam may support a communication link between communications devices. In some examples, a unified linear array with phase shifters is used to form the multiple beams. The unified linear array may include multiple antenna arrays. Each antenna array may include a set of antennas and be used to form one of the multiple beams. Also, each antenna array may be coupled with a set of phase shifters, where each phase shifter may correspond to a respective antenna of the set of antennas. In some examples, the quantity of phase shifters is based on the number of antennas multiplied by the number of beams (which may correspond to the quantity of communication links). In some examples, the cost, complexity, and power consumption of a transceiver may be based on the quantity of phase shifters and antennas—e.g., the cost, complexity, and power consumption may increase as the quantity of phase shifters and antennas increases. Thus, beamforming techniques that use a unified linear array to support multiple communication links may be associated with high costs, complexity, and power consumption.

To reduce cost, complexity, power consumption, or any combination thereof, a lens loaded antenna may be used to form the multiple beams. A lens loaded antenna may include a set of antennas that are coupled with a lens. To perform beamformed communications, a communications device may transmit a first signal over a first subset of antennas (e.g., a single antenna) of the set of antennas and received a second signal over a second subset of antennas (e.g., a single antenna) of the set of antennas. The first subset of antennas may be positioned compared to the lens so that the lens focuses (e.g., collimates) the first signal in the direction of a first communications device and the second subset of antennas may be positioned compared to the lens so that the lens focuses the second signal in the direction of the second subset of antennas. That is, for a lens loaded antenna, beams may be formed by shifting a location of an emitter/detector at the back focal plane of the antenna. Thus, a lens loaded antenna may not use phase shifters to form multiple beams, and a cost, complexity, power consumption, or any combination thereof may be reduced compared to a unified linear array.

Though a lens loaded antenna may be used to form beams with lower cost, complexity, power consumption, or any combination thereof, compared to a unified linear array, a lens loaded antenna may experience an increased amount of self-interference compared to the unified linear array. In some examples, reflections of signals transmitted from a first subset of antennas through a lens may be detected at another subset of antennas configured to receive signals from a communications device.

Accordingly, to form beams with a reduced cost, complexity, and power consumption than a unified linear array and with less self-interference than a lens loaded antenna, an enhanced beamforming configuration may be used. The enhanced beamforming configuration may include a lens that is coupled with set of antenna arrays (rather than antennas), where the antenna arrays may include antennas that are coupled with phase shifters. In some examples, first communications device includes a set of antenna arrays and a lens. A communications manager (e.g., base station communications manager 106 or UE communications manager 116) of the first communications device may transmit, from an antenna array that is in a first position compared to the lens, a downlink signal to another communications device through the lens, and the lens may focus the downlink signal in the direction of the second communications device. To reduce interference to other antenna arrays that are in other positions compared to the lens, the downlink signal may be formed (e.g., using a set of phase shifters) so that an energy of a portion of the downlink signal is below a threshold. The reduced-energy portion of the downlink signal may be based on a position of a second antenna array compared to first antenna array and the lens. The first communications device may concurrently receive, at the second antenna array, an uplink signal from a third communications device, where the lens may focus the second signal in the direction of the antenna array.

By forming the downlink signal with a reduced-energy portion, an energy of a corresponding portion in a reflection of the downlink signal may also be below a threshold (e.g., the same or a different threshold). Also, by forming the reduced-energy portion based on a position of the second antenna array, the corresponding portion of the reflection may be aligned with (e.g., overlap with a position of) the second antenna array. Thus, interference to the second antenna array caused by the reflection of the downlink signal may be reduced, and signal characteristics (e.g., SINR) of the uplink signal received at the second antenna array may be improved. By increasing a signal quality of signals received at the second antenna array, a quantity of transmission failures may be decreased, and thus, a throughput of a radio access network may be increased.

FIGS. 2A through 2D illustrates examples of a wireless communications subsystem that supports lens communication with multiple antenna arrays in accordance with aspects of the present disclosure.

Subsystem 200-*a* depicts first communications device 201, second communications device 202, and third communications device 203, which may each be examples of a base station or UE as described herein. First communications device 201, second communications device 202, and third communications device 203 may communicate with one another as described with reference to FIG. 1.

Third communications device 203 may include lens 215 and a set of antenna arrays 225 (e.g., first antenna array 225-1 through Nth antenna array 225-N). In some examples, lens 215 may be external to third communications device 203. In one example, a distance between lens 215 and antenna arrays 225 may be based on a far-field length. A far-field length may be a region away from the antenna where the radiation pattern does not change shape as the distance increases. For example, the distance between lens 215 and antenna arrays 225 may be greater than a far-field length associated with communications to and from third communications device 203. An equation to calculate the far-field length may be obtained by calculating $2D^2/\lambda$, where D may be equivalent to the diameter of the antenna arrays 225. In some cases, the far-field length may be calculated based on a distance between the antenna arrays (e.g., a distance between first antenna array 225-1 and second antenna array 225-2) and a wavelength of communications to and from third communications device 203. A spacing between the antenna arrays 225 may be configured to increase beam separation after a beam propagates through lens 215 for full spherical coverage (e.g., based on the diameter of lens 215).

In some examples, a spacing between the antenna arrays 225 is equivalent to $\lambda/2$, and the diameter of the antenna arrays 225 is equivalent to $N\lambda/2$ for N antenna arrays 225, where $\lambda$ is a wavelength of a transmission from an antenna array and N is the quantity of antenna arrays. In such cases, the far-field length may be obtained by calculating $$\frac{2\left(\frac{N\lambda}{2}\right)^2}{\lambda},$$

which may reduce to $N^2\lambda/2$. For example, for eight (8) antenna arrays 225 (e.g., N=8) and a 140 GHz (e.g., $\lambda$=140 GHz) wavelength, the far-field length may be around 69 millimeters. In some examples, a threshold distance may be associated with the distance between the lens 215 and antenna array 225, where the threshold distance may be around a meter.

Each antenna array 225 may include a set of phase shifters (e.g., like phase shifter 235). The phase shifters may be configured to change a phase of signals at an input of the phase shifters. In some examples, the phase shifters may also be configured to scale (e.g., amplify or reduce) the signals at the input of the phase shifters. The value(s) selected for the phase shifting and, in some examples, scaling may be referred to as beam coefficients. A set of phase shifters may output a set of modified signals that when transmitted from respective antennas (e.g., like antenna 230) coherently combine in one direction and destructively combine in other direction to form a beam (e.g., a transmit or receive beam) in the one direction, where the energy of the modified signal may be concentrated within the beam. In some examples, the phase shifters are configured in a two-dimensional phase shifter array and are each connected to a unified rectangular antenna array that comprises the antenna arrays 225.

In some examples, a diameter of the lens may be configured to be larger than a diameter of the antenna arrays 225. In some examples, the lens may be configured to increase the energy captured from each beam of the antenna arrays 225—e.g., to capture the maximum aperture of each main lobe. Lens 215 may be a two-dimensional lens. Lens 215 may be configured to focus signals received at a first side of the lens—e.g., based on a shape of the lens.

In some examples, third communications device 203 may support full duplexed communications with one or more other communications devices (e.g., first communications device 201 and second communications device 202). Third communications device 203 may transmit downlink information to first communications device 201 in first focused signal 205-f of FIG. 2A, which may be a focused version of first signal 205 of FIG. 2A. Concurrently (e.g., in an overlapping time period), third communications device 203 may also may receive uplink information from second communications device 202 in second focused signal 210-f of FIG. 2C. Third communications device 203 may transmit first signal 205 to first communications device 201 using lens 215, where lens 215 may focus first signal 205 to obtain first focused signal 205-f. First focused signal 205-f may propagate in the direction of first communications device 201. Third communications device 203 may also receive second signal 210 using lens 215, where lens 215 may focus second signal 210 to obtain second focused signal 210-f. Second focused signal 210-f may propagate in the direction of first antenna array 225-1. Lens 215 may focus signals in a direction based on a shape of lens 215 and a position on lens 215 where a signal arrives.

Figure 2A:
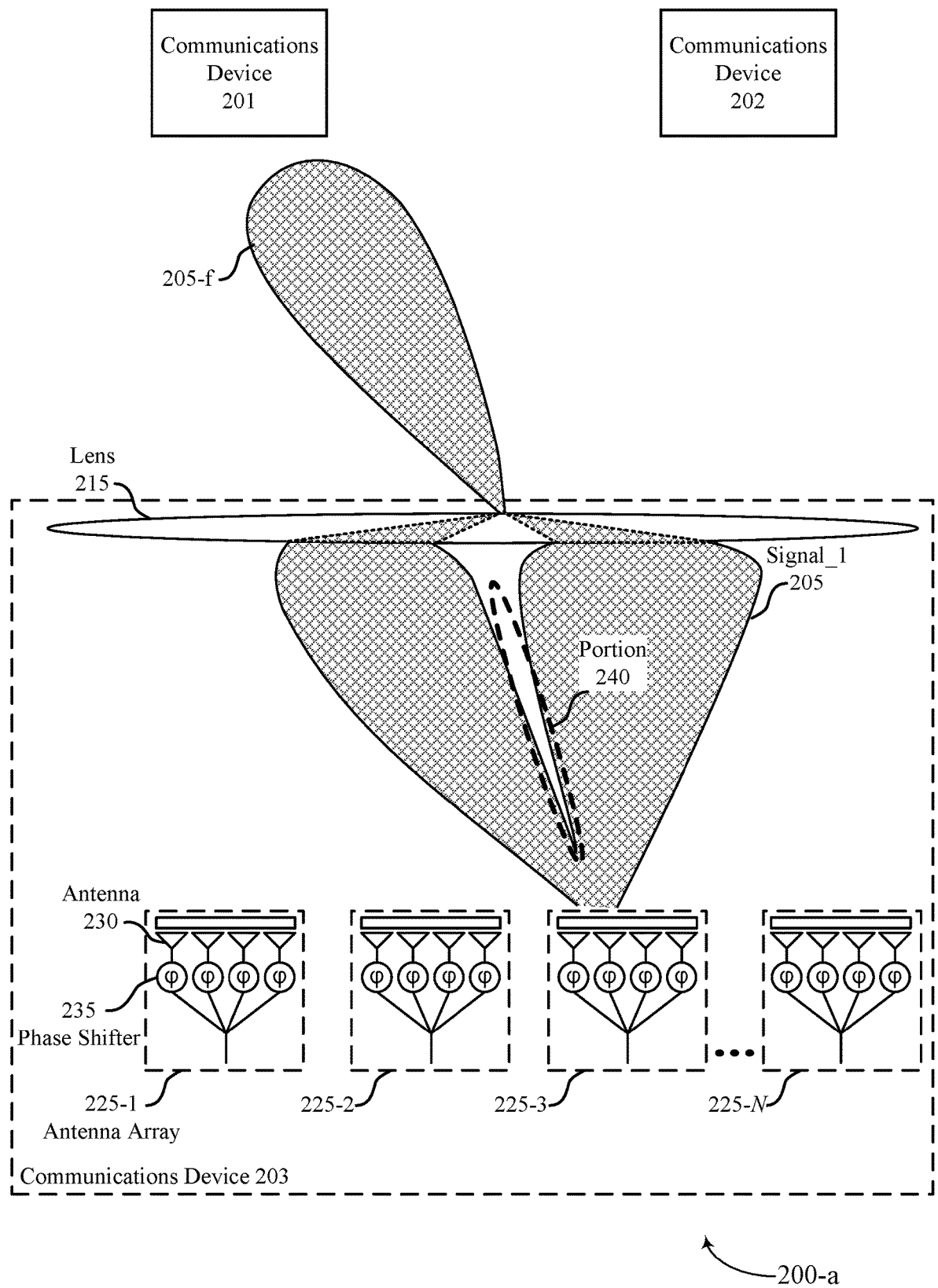
FIGS. 2A through 2D illustrate examples of a wireless communications subsystem that supports lens communication with multiple antenna arrays in accordance with aspects of the present disclosure.
Figure 2B:
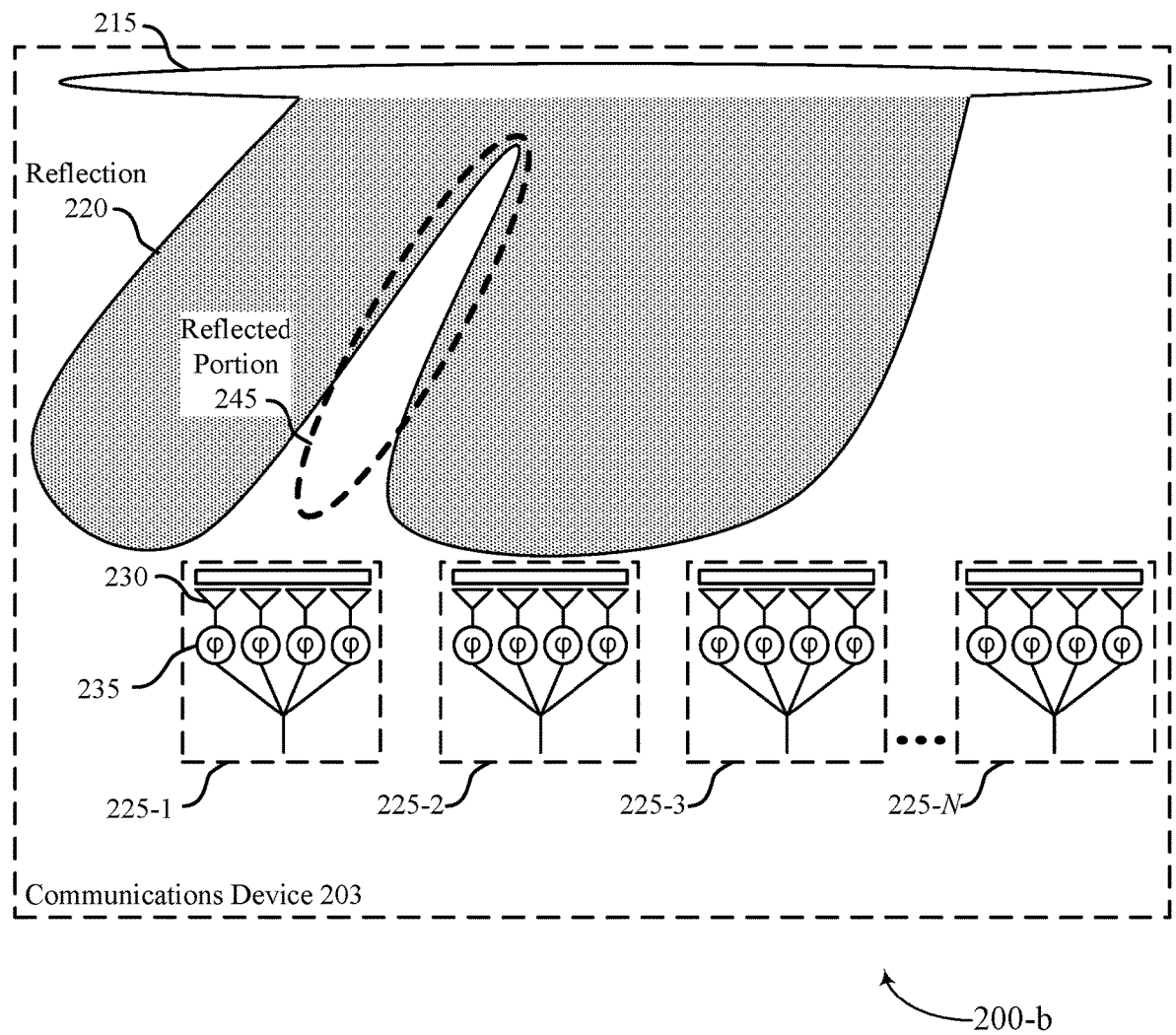
Figure 2C:
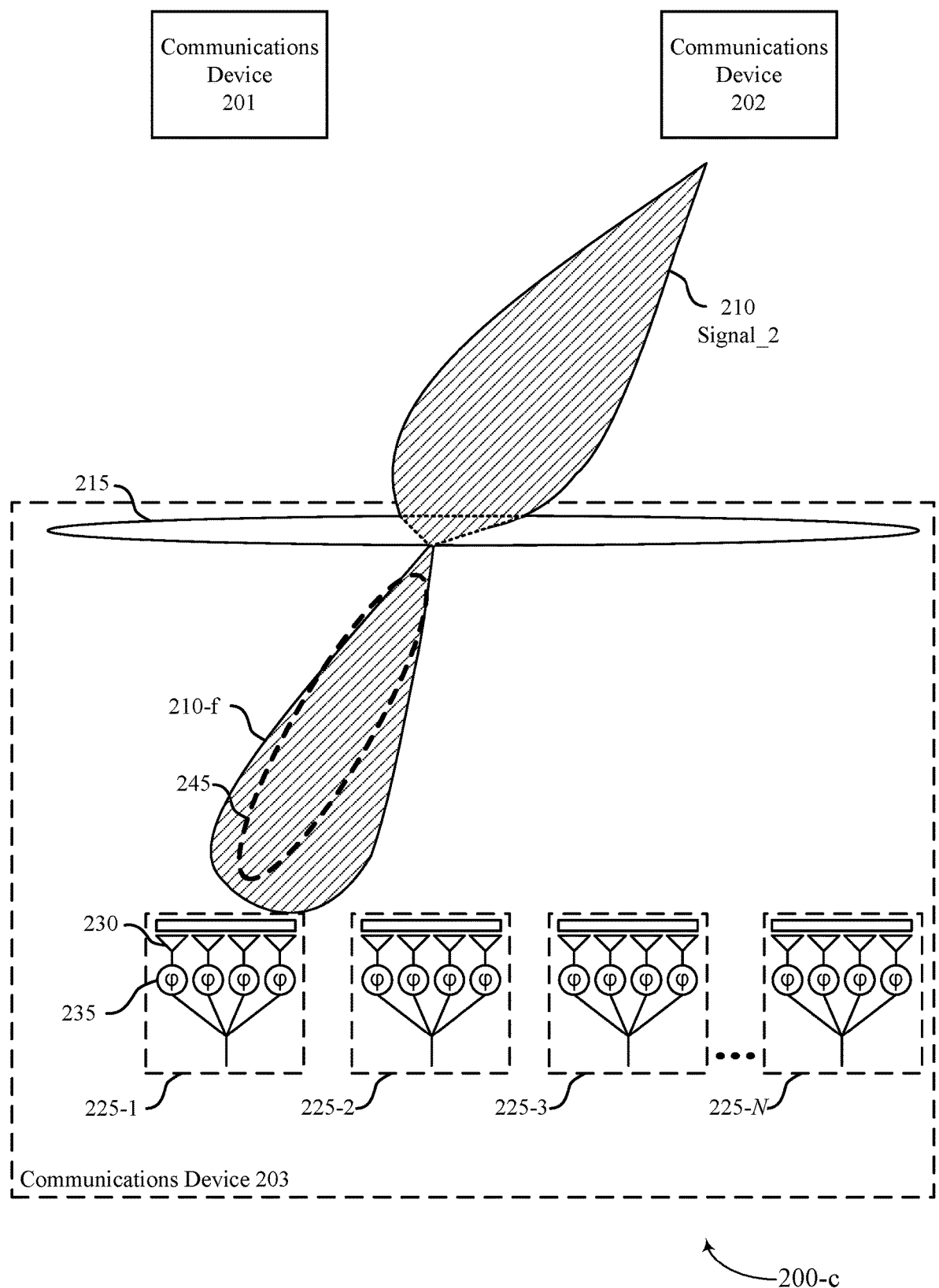

Reflection 220 of FIG. 2B may result from transmitting first signal 205 using lens 215, where reflection 220 may be a reflection of first signal 205. To prevent reflection 220 from interfering with the reception of second focused signal 210-f at first antenna array 225-1, third communications device 203 may configure third antenna array 225-3 to perform a null steering operation. A null steering operation may involve applying, by an antenna array, beam coefficients to a signal so that an energy of the resulting signal is below a threshold in an area emanating from the antenna array. In one example, the null steering operation may result in the energy of first signal 205 being below a threshold (e.g., less than negative 3 dB) in an area emanating from third antenna array 225-3. This area may also be referred to as portion 240 of first signal 205-1. In some examples, portion 240 of first signal 205-1 may be referred to as a null portion. The direction of the portion 240 of first signal 205-1 that is below the threshold may be formed such that a corresponding reflected portion 245 of reflection 220 is below the threshold or another threshold (e.g., a smaller threshold). The direction of the corresponding reflected portion 245 of reflection 220 may be in a direction of first antenna array 225-1 such that an energy of reflection 220 around (e.g., at) first antenna array 225-1 is below the relevant threshold. In some examples, the corresponding reflection portion 245 of reflection 220 may be referred to as a null reflection portion. Accordingly, first antenna array 225-1 may receive the second signal 210 without (or with minimal) interference from reflection 220.

In some examples, the techniques describe herein are used to support integrated access backhaul communications (e.g., between base stations), for communications between communications devices within data centers, for communications between base stations and UEs, or in any combination thereof.

Figure 2D:
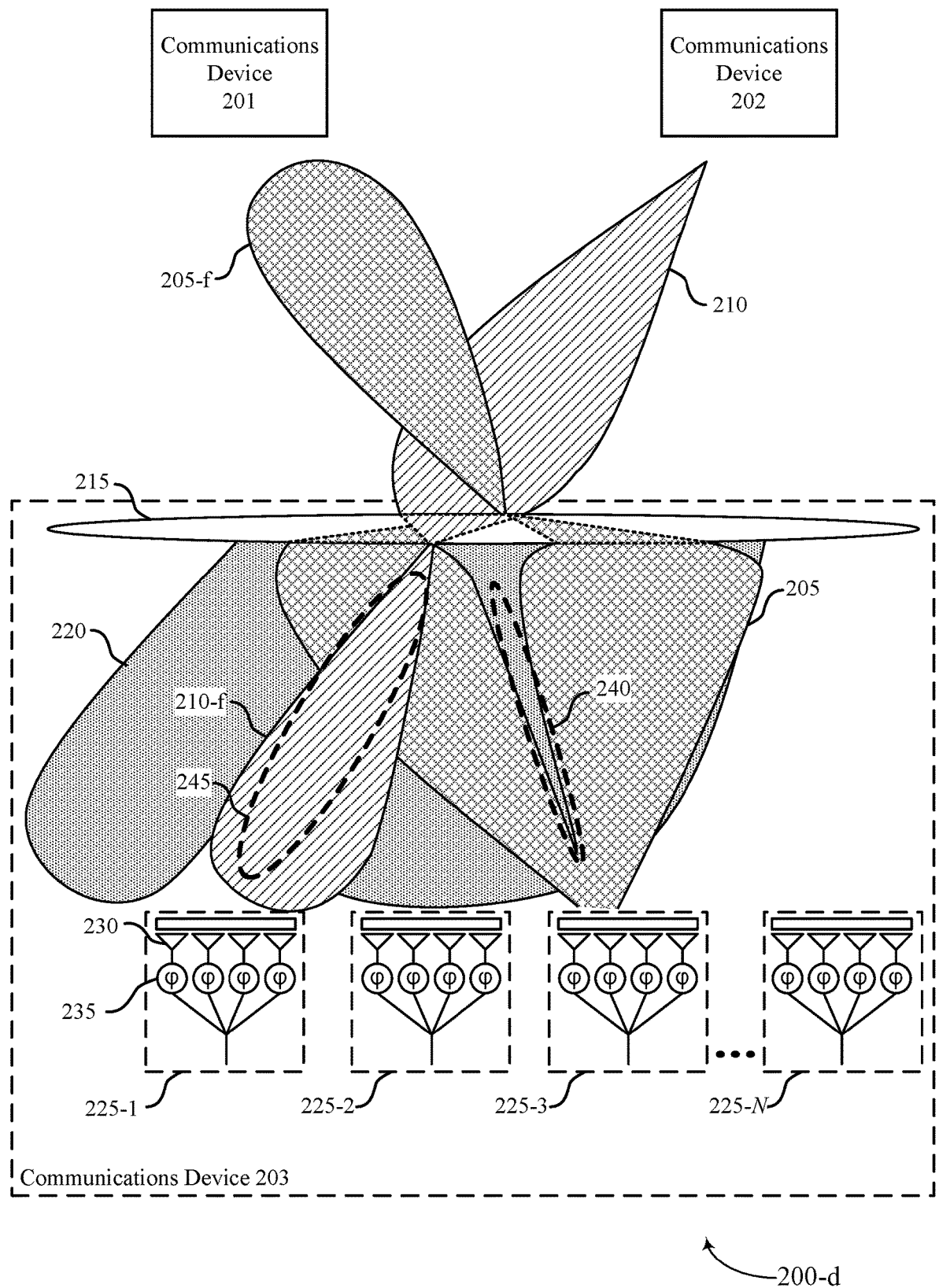

As described herein, the enhanced lens configuration may support full duplexed communications, such that third communications device 203 is able to concurrently (e.g., during completely or partially overlapping time periods) transmit signaling to first communications device 201 and receive signaling from second communications device 202. Accordingly, FIG. 2D shows the signals of FIGS. 2A through 2C superimposed on one another to illustrate an example where the signals are concurrently active.

Figure 3:
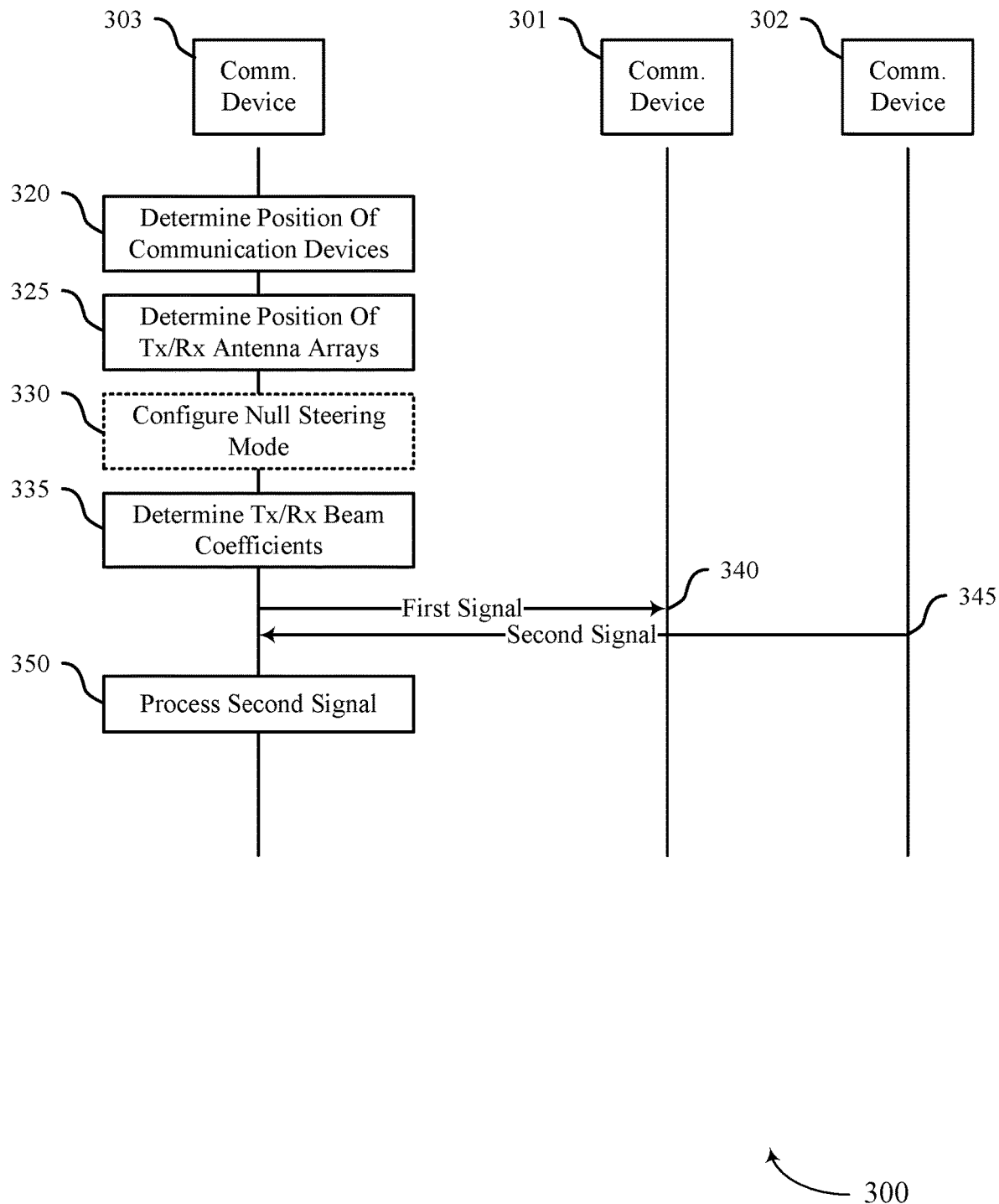
FIG. 3 illustrates an example set of operations that supports lens communication with multiple antenna arrays in accordance with aspects of the present disclosure.

FIG. 3 illustrates an example of a set of operations that supports lens communication with multiple antenna arrays in accordance with aspects of the present disclosure.

Process flow 300 may be performed by first communications device 301, second communications device 302, and third communications device 303, which may be examples of first communications device 201, second communications device 202, and third communications device 203 as described with reference to FIGS. 2A through 2D. In some examples, communications device 301, second communications device 302, and third communications device 303 may communicate with one another using higher frequencies (e.g., sub-THz frequencies) associated with smaller wavelengths such that a distance between an antenna array and a lens is larger than a far-field length and smaller than a threshold (e.g., a meter, a decimeter, etc.).

In some examples, process flow 300 illustrates an exemplary sequence of operations performed to support lens communication with multiple antenna arrays. For example, process flow 300 depicts operations for determining beam coefficients for simultaneous uplink and downlink transmissions to and from third communications device 303 using a lens.

It is understood that one or more of the operations described in process flow 300 may be performed earlier or later in the process, omitted, replaced, supplemented, or performed in combination with another operation. Also, additional operations described herein that are not included in process flow 300 may be included.

At 320, third communications device 303 may determine a position of communications devices (e.g., including first communications device 301 and second communications device 302) in a communication range of third communications device 303. In some examples, third communications device 303 may determine that first communications device 301 is in a first geographic region and second communications device is in a second geographic region.

At 325, third communications device 303 may determine a position of transmit and receive antenna arrays for transmitting to the communications devices. In some examples, third communications device 303 reconfigures a set of antenna arrays (e.g., configuring a first subset of antenna arrays for transmitting and a second subset of antenna arrays for receiving) to support full duplex communications with first communications device 301 and second communications device 302.

At 330, third communications device 303 may configure a null steering transmission mode—e.g., based on a position of first communications device 301 and second communications device 302. While in the null steering transmission mode, third communications device 303 may transmit, from a first subset of antenna arrays (e.g., a single antenna array), signals including portions (which may be referred to as null portions) having reduced energy values (e.g., similar to first signal 205 of FIGS. 2A through 2D) so that interference caused by reflections of the signals at a second subset of antenna arrays (e.g., a single antenna array) is reduced.

In some examples, before the null steering transmission mode is configured, third communications device 303 may perform full duplex communications with communications devices using antennas that are interleaved across the antenna arrays of third communications device 303—e.g., based on the interference caused by transmissions being below a threshold. Such a configuration may operate similarly to a lens loaded antenna configuration. In some examples, before the null steering transmission mode is configured, third communications device 303 may perform full duplex communications with communications devices using a subset of the antenna arrays, where the other antenna arrays (e.g., antenna arrays at edges of the antenna assembly) may be switched off—e.g., based on the interference caused by transmissions being below a threshold. Communicating using interleaved antennas or a subset of the antenna arrays may reduce a power consumption of third communications device 303. In some examples, third communications device 303 may be unable to switch between a reduced power mode and null steering mode, and in such cases, may always be configured in the null steering mode. In some examples, third communications device communicates with first communications device 301 and another communications device in the reduced power mode, and activates the null steering mode based on establishing a connection with second communications device 302—e.g., based on a position of second communications device 203 compared to first communications device 301.

At 335, third communications device 303 may determine beam coefficients for transmitting signals to first communications device 301 and receiving signals from second communications device 302. Third communications device 303 may determine beam coefficients for transmitting signals from a downlink antenna array based on a position of first communications device 301 and a position of one or more uplink antenna arrays configured to receive signals from second communications device 302. In some examples, an antenna array (e.g., third antenna array 225-3 of FIGS. 2A through 2D) may be configured for downlink transmissions to first communications device 301 and another antenna array (e.g., first antenna array 225-1 of FIGS. 2A through 2D) may be configured for uplink transmissions from second communications device 302. Third communications device 303 may select beam coefficients that, in combination with a lens, will focus a transmitted signal (e.g., similar to first signal 205 of FIGS. 2A through 2D) in the direction of first communications device and that additionally form a reduced-energy portion (which may also be referred to as a null portion) of the transmitted signal based on a position of the uplink antenna array. The reduced-energy portion of the transmitted signal may correspond to a reduced-energy portion (which may also be referred to as a null reflected portion) of a reflection (e.g., similar to reflection 220 of FIGS. 2A through 2D) of the transmitted signal that overlaps with the position of the uplink antenna array.

Third communications device 303 may also determine beam coefficients for receiving signals at an uplink antenna array based on a position of second communications device 302 and a position of one or more downlink antenna arrays. In some examples, the third communications device 303 may select beam coefficients that focus a receive beam in a direction of a signal focused by the lens in the direction of the uplink antenna array, the signal transmitted from second communications device 302. In some examples, the direction of the receive beam is configured to further decrease interference caused by the reflection of the signal transmitted to first communications device 301. A receive beam may focus a signal detection operation so that an increased amount of signal energy is detected in the beam and a decreased amount of signal energy is detected outside the beam compared to if a receive beam was not formed.

In some examples, third communications device 303 determines the beam coefficients for the downlink antenna arrays, uplink antenna arrays, or both, based on a table that indicates interference parameters between different antenna arrays. That is, in some examples, third communications device 303 may include a table that indicates, for each antenna array, a level and direction of interference caused to other antenna arrays when a signal is transmitted from a respective antenna array. The third communications device 303 may use the table to determine a set of beam coefficients to use for transmitting, from a downlink antenna array, a signal that forms a reduced-energy portion of the signal in a direction that corresponds to a reflected reduced-energy portion that is formed in the direction of an uplink antenna array.

In some examples (e.g., when multiple uplink antenna arrays are configured), interference caused by a transmitted signal to one or more of the uplink antenna arrays may be unavoidable. In such cases, third communications device 303 may configure the one or more uplink antenna arrays to form receive beams that reduce interference caused by reflections of the transmitted signal—e.g., by pointing the receive beam in a direction where an energy of the reflection is reduced.

At 340, third communications device 303 transmits a first signal (which may be similar to first signal 205 of FIGS. 2A through 2D) to first communications device 301 based on the beam coefficients determined for the downlink antenna array. The first signal may include a reduced-energy (or nulled) portion that corresponds to a reduced-energy portion of a reflection (e.g., which may be similar to reflection 220) that overlaps with an uplink antenna array at third communications device 303.

At 345, third communications device 303 may receive a second signal from second communications device 302. In some examples, the second signal may be transmitted concurrently with the first signal over (e.g., completely or partially) overlapping time and frequency resources. The lens at third communications device 303 may focus the second signal transmitted from second communications device 302 in the direction of the uplink antenna array. In some examples, the focused second signal may (e.g., completely or partially) overlap with the reduced-energy portion of the reflection of the first signal.

At 350, third communications device 303 may process the second signal. Processing the second signal may include demodulating and decoding the second signal. In some examples, third communications device 303 modifies the beam coefficients used for the downlink antenna array, the uplink antenna array, or both, based on the processed second signal. For example, third communications device 303 may refine the beam coefficients to improve a quality of signals (e.g., SNR, SINR, etc.) received from second communications device 302.

Figure 4:
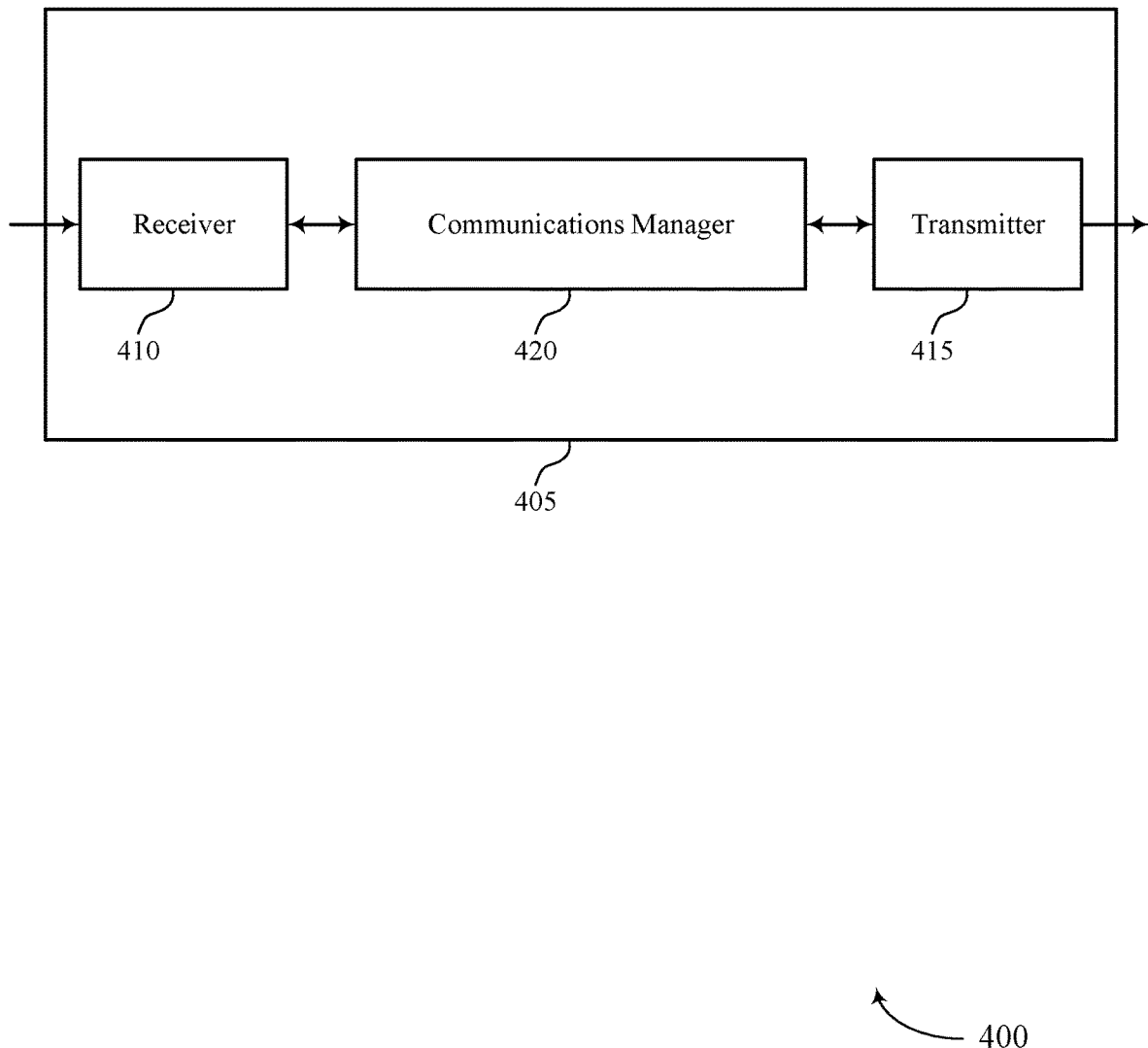
FIGS. 4 and 5 show block diagrams of devices that support lens communication with multiple antenna arrays in accordance with aspects of the present disclosure.

FIG. 4 shows a block diagram 400 of a device 405 that supports lens communication with multiple antenna arrays in accordance with aspects of the present disclosure. The device 405 may be an example of aspects of a UE 115 or a base station 105 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to lens communication with multiple antenna arrays). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to lens communication with multiple antenna arrays). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of lens communication with multiple antenna arrays as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a first communications device in accordance with examples as disclosed herein. For example, the communications manager 420 may be configured as or otherwise support a means for transmitting, from a first antenna array of the first communications device, a first signal through a lens of the first communications device in a direction of a second communications device, an energy of a portion of the first signal being below a threshold, where a position of the portion of the first signal is based on a position of a second antenna array of the first communications device. The communications manager 420 may be configured as or otherwise support a means for receiving, at the second antenna array and at least in part concurrently with transmitting the first signal, a second signal from a third communications device, the second signal being focused in a direction of the second antenna array based on the lens.

Figure 5:
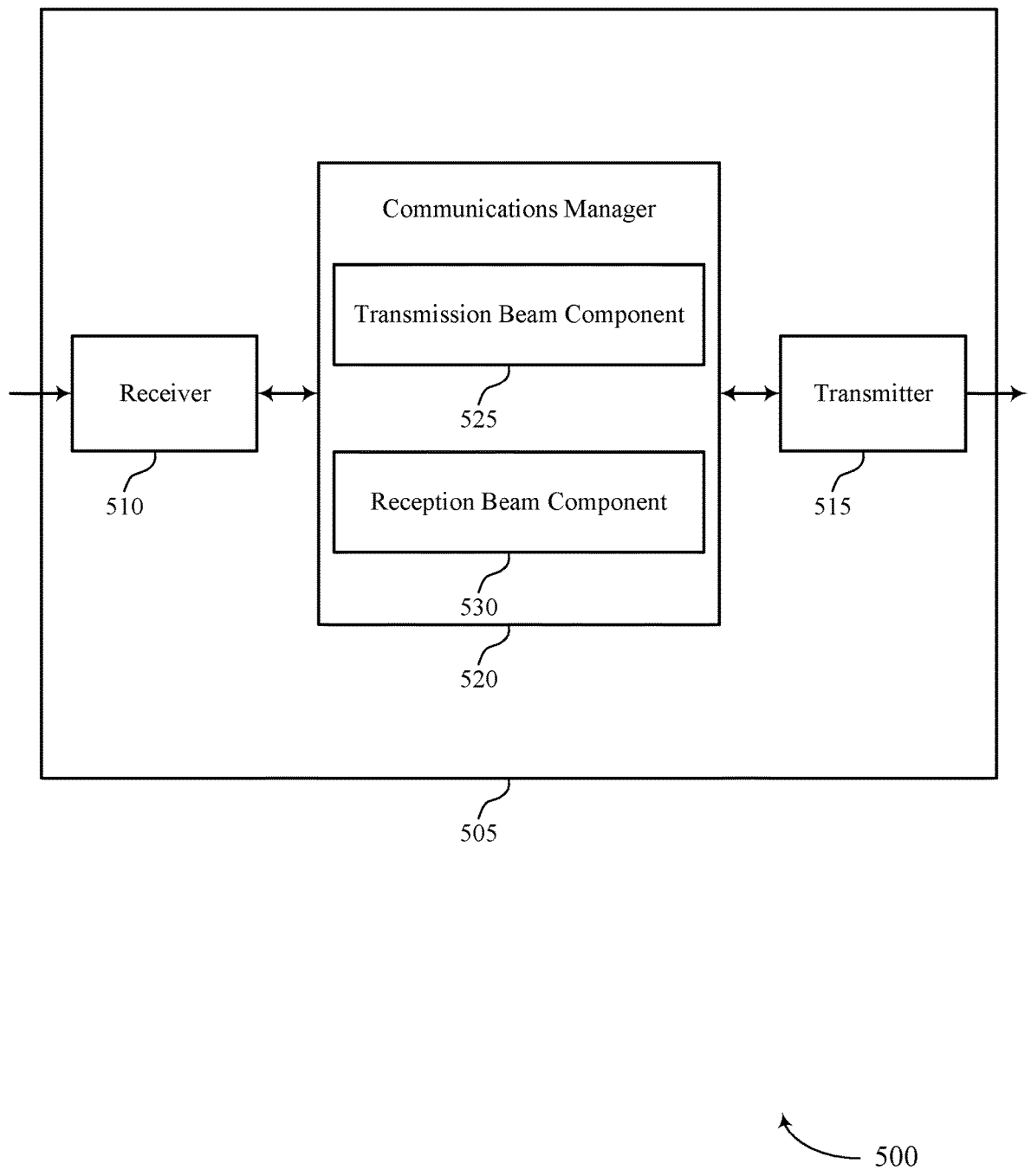

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reducing interference caused by reflections of transmissions from a first antenna array to a second antenna array that is configured to receive transmissions FIG. 5 shows a block diagram 500 of a device 505 that supports lens communication with multiple antenna arrays in accordance with aspects of the present disclosure. The device 505 may be an example of aspects of a device 405, a UE 115, or a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to lens communication with multiple antenna arrays). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to lens communication with multiple antenna arrays). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of lens communication with multiple antenna arrays as described herein. For example, the communications manager 520 may include a transmission beam component 525 a reception beam component 530, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first communications device in accordance with examples as disclosed herein. The transmission beam component 525 may be configured as or otherwise support a means for transmitting, from a first antenna array of the first communications device, a first signal through a lens of the first communications device in a direction of a second communications device, an energy of a portion of the first signal being below a threshold, where a position of the portion of the first signal is based on a position of a second antenna array of the first communications device. The reception beam component 530 may be configured as or otherwise support a means for receiving, at the second antenna array and at least in part concurrently with transmitting the first signal, a second signal from a third communications device, the second signal being focused in a direction of the second antenna array based on the lens.

Figure 6:
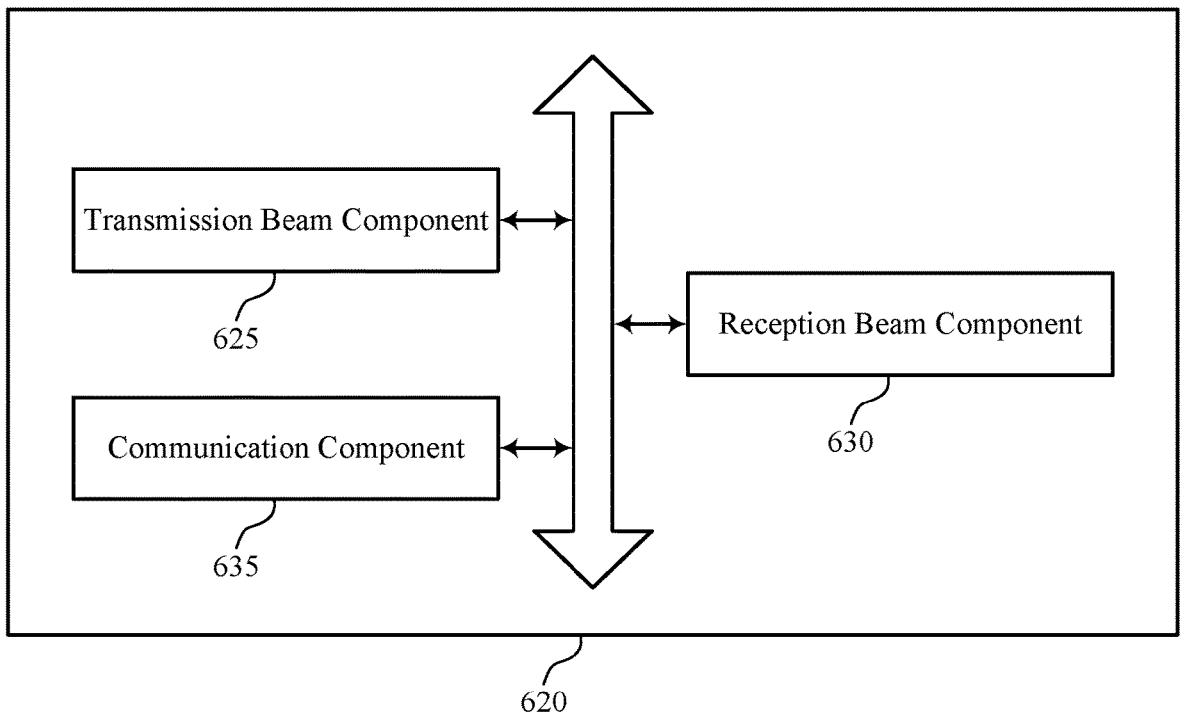
FIG. 6 shows a block diagram of a communications manager that supports lens communication with multiple antenna arrays in accordance with aspects of the present disclosure.

FIG. 6 shows a block diagram 600 of a communications manager 620 that supports lens communication with multiple antenna arrays in accordance with aspects of the present disclosure. The communications manager 620 may be an example of aspects of a communications manager 420, a communications manager 520, or both, as described herein. The communications manager 620, or various components thereof, may be an example of means for performing various aspects of lens communication with multiple antenna arrays as described herein. For example, the communications manager 620 may include a transmission beam component 625, a reception beam component 630, a communication component 635, or any combination thereof. Each of these components may communicate, directly or indirectly, with one another (e.g., via one or more buses).

The communications manager 620 may support wireless communication at a first communications device in accordance with examples as disclosed herein. The transmission beam component 625 may be configured as or otherwise support a means for transmitting, from a first antenna array of the first communications device, a first signal through a lens of the first communications device in a direction of a second communications device, an energy of a portion of the first signal being below a threshold, where a position of the portion of the first signal is based on a position of a second antenna array of the first communications device. The reception beam component 630 may be configured as or otherwise support a means for receiving, at the second antenna array and at least in part concurrently with transmitting the first signal, a second signal from a third communications device, the second signal being focused in a direction of the second antenna array based on the lens.

In some examples, a reflection of the first signal occurs based on transmitting the first signal through the lens, a portion of the reflection corresponding to the portion of the first signal and overlapping with the second antenna array, and an energy of the portion of the reflection being below a second threshold.

In some examples, the transmission beam component 625 may be configured as or otherwise support a means for determining beam coefficients for the first antenna array based on, compared to the lens, the position of the second antenna array and a position of the first antenna array, where the portion of the first signal corresponds to a portion of a reflection of the first signal that overlaps with the second antenna array based on the beam coefficients. In some examples, the transmission beam component 625 may be configured as or otherwise support a means for applying the beam coefficients to a data signal received at the first antenna array to form the first signal.

In some examples, to support determining the beam coefficients, the transmission beam component 625 may be configured as or otherwise support a means for determining the beam coefficients for the first antenna array based on a position of the second communications device, where the first signal is focused in the direction of the second communications device based on the beam coefficients and the lens.

In some examples, the transmission beam component 625 may be configured as or otherwise support a means for selecting, from a set of multiple antenna arrays of the first communications device, the first antenna array for transmitting the first signal to the second communications device based on a position of the second communications device. In some examples, the reception beam component 630 may be configured as or otherwise support a means for selecting, from the set of multiple antenna arrays, the second antenna array for receiving signals from the third communications device based on a position of the third communications device and a position of the first antenna array compared to the second antenna array.

In some examples, the transmission beam component 625 may be configured as or otherwise support a means for disabling a subset of the set of multiple antenna arrays based on the position of the second communications device and the third communications device.

In some examples, the transmission beam component 625 may be configured as or otherwise support a means for transmitting, from the first antenna array and a third antenna array of the first communications device, a third signal to a fourth communications device, where a mode associated with nulling a portion of transmissions from the first communications device is disabled based on, compared to the position of the second antenna array, a position of the third antenna array and a position of the first antenna array. In some examples, the communication component 635 may be configured as or otherwise support a means for establishing a connection with the second communications device. In some examples, the transmission beam component 625 may be configured as or otherwise support a means for activating the mode based on a position of the second communications device compared to the third communications device, the first signal being transmitted from the first antenna array based on activating the mode.

In some examples, the reception beam component 630 may be configured as or otherwise support a means for determining beam coefficients for the second antenna array based on a reflection of the first signal, where the beam coefficients cancel interference caused by the reflection of the first signal. In some examples, the reception beam component 630 may be configured as or otherwise support a means for applying the beam coefficients to the second signal received at the second antenna array.

In some examples, a distance between the lens and a set of multiple antenna arrays of the first communications device is based on a wavelength of the first signal and a diameter of the set of multiple antenna arrays, the set of multiple antenna arrays including the first antenna array and the second antenna array.

In some examples, a diameter of the lens is greater than the diameter of the set of multiple antenna arrays.

In some examples, a frequency of the first signal exceeds a frequency threshold associated with a distance between the first antenna array and the lens.

Figure 7:
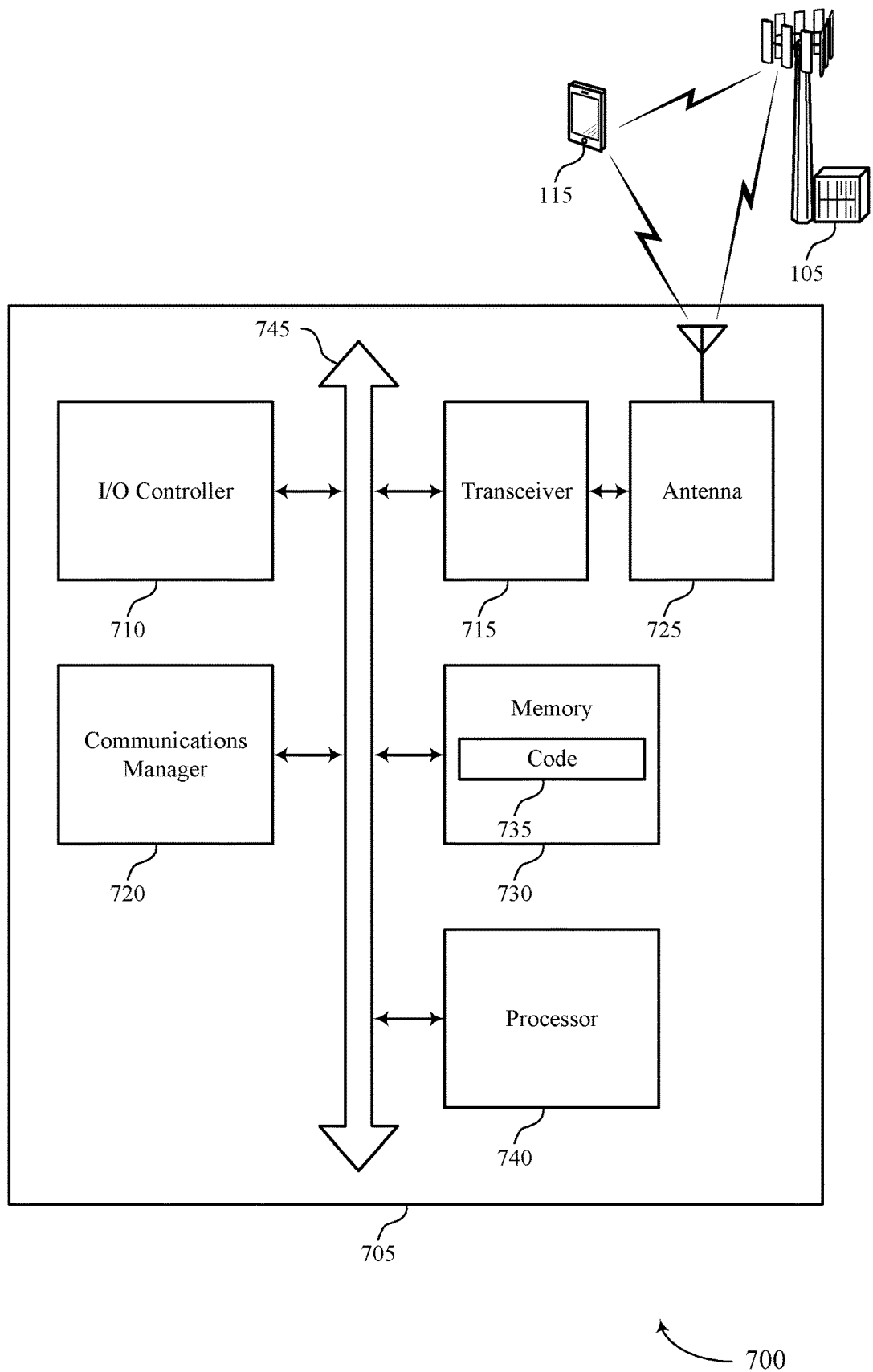
FIG. 7 shows a diagram of a system including a UE that supports lens communication with multiple antenna arrays in accordance with aspects of the present disclosure.

FIG. 7 shows a diagram of a system 700 including a device 705 that supports lens communication with multiple antenna arrays in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The one or more antennas 725 may be coupled with a lens. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting lens communication with multiple antenna arrays). For example, the device 705 or a component of the device 705 may include a processor 740 and memory 730 coupled to the processor 740, the processor 740 and memory 730 configured to perform various functions described herein.

The communications manager 720 may support wireless communication at a first communications device in accordance with examples as disclosed herein. For example, the communications manager 720 may be configured as or otherwise support a means for transmitting, from a first antenna array of the first communications device, a first signal through a lens of the first communications device in a direction of a second communications device, an energy of a portion of the first signal being below a threshold, where a position of the portion of the first signal is based on a position of a second antenna array of the first communications device. The communications manager 720 may be configured as or otherwise support a means for receiving, at the second antenna array and at least in part concurrently with transmitting the first signal, a second signal from a third communications device, the second signal being focused in a direction of the second antenna array based on the lens.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of lens communication with multiple antenna arrays as described herein, or the processor 740 and the memory 730 may be otherwise configured to perform or support such operations.

Figure 8:
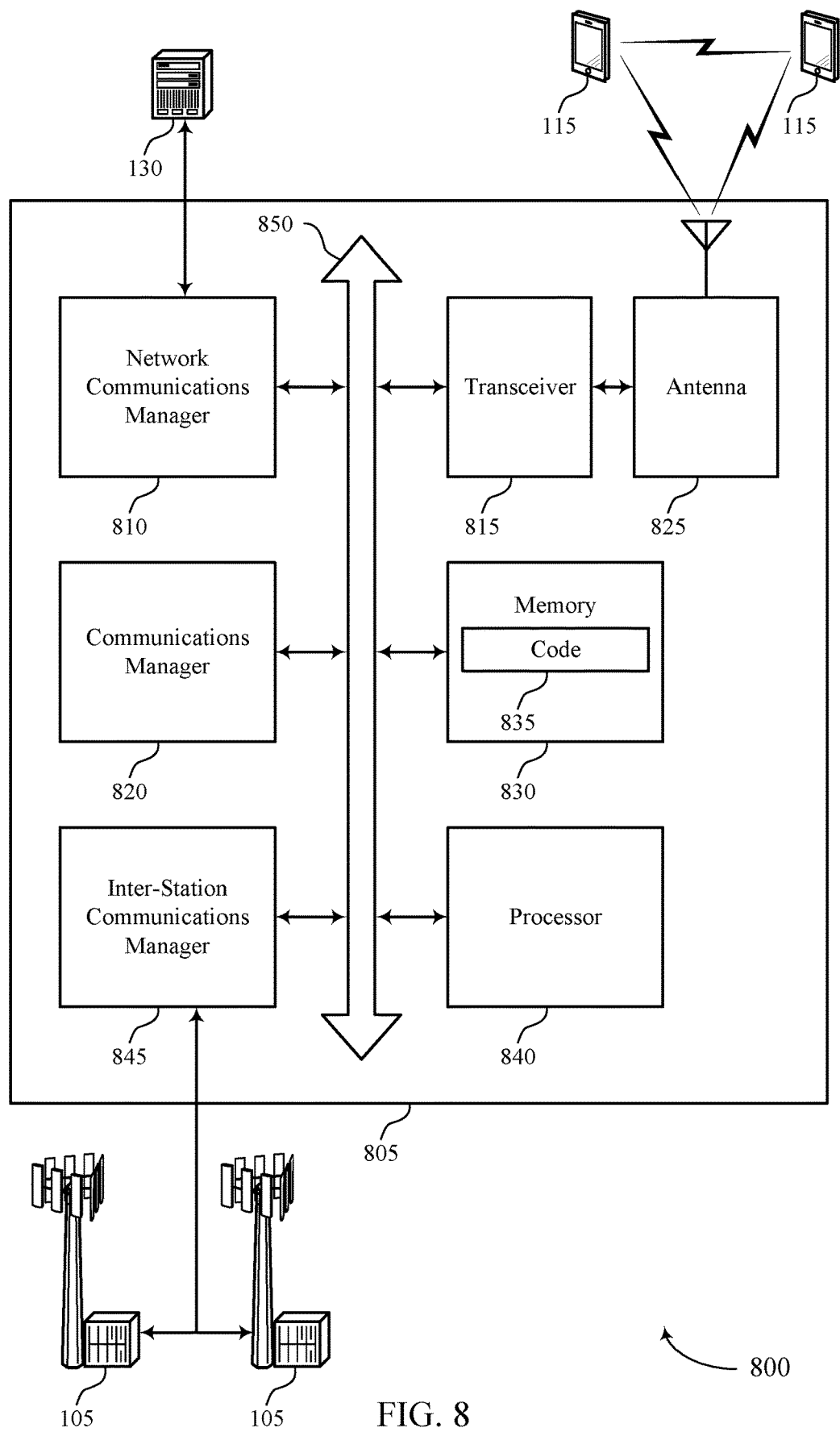
FIG. 8 shows a diagram of a system including a base station that supports lens communication with multiple antenna arrays in accordance with aspects of the present disclosure.

FIG. 8 shows a diagram of a system 800 including a device 805 that supports lens communication with multiple antenna arrays in accordance with aspects of the present disclosure. The device 805 may be an example of or include the components of a device 405, a device 505, or a base station 105 as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 415, a transmitter 515, a receiver 410, a receiver 510, or any combination thereof or component thereof, as described herein.

The memory 830 may include RAM and ROM. The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a BIOS which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting lens communication with multiple antenna arrays). For example, the device 805 or a component of the device 805 may include a processor 840 and memory 830 coupled to the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communication at a first communications device in accordance with examples as disclosed herein. For example, the communications manager 820 may be configured as or otherwise support a means for transmitting, from a first antenna array of the first communications device, a first signal through a lens of the first communications device in a direction of a second communications device, an energy of a portion of the first signal being below a threshold, where a position of the portion of the first signal is based on a position of a second antenna array of the first communications device. The communications manager 820 may be configured as or otherwise support a means for receiving, at the second antenna array and at least in part concurrently with transmitting the first signal, a second signal from a third communications device, the second signal being focused in a direction of the second antenna array based on the lens.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of lens communication with multiple antenna arrays as described herein, or the processor 840 and the memory 830 may be otherwise configured to perform or support such operations.

Figure 9:
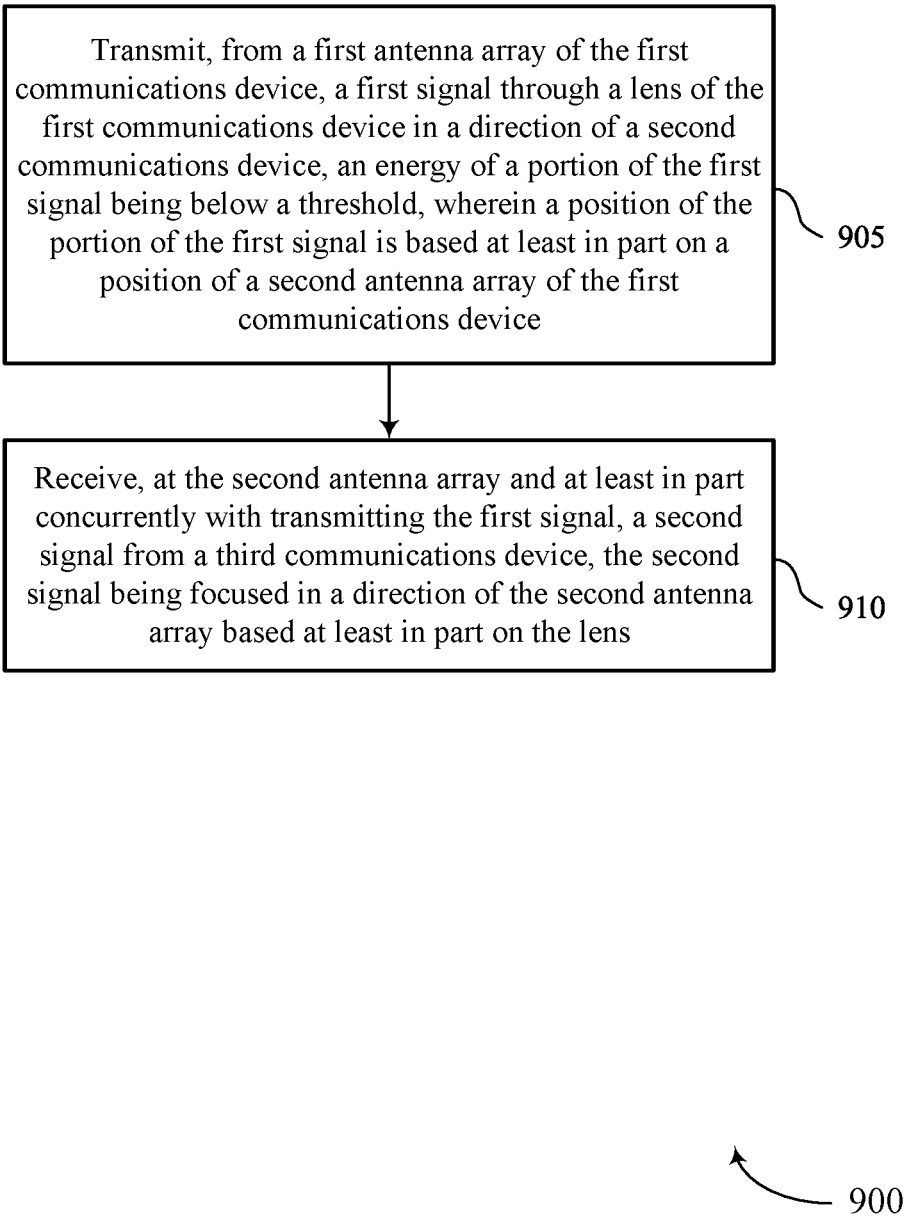
FIGS. 9 through 11 show flowcharts illustrating methods that support lens communication with multiple antenna arrays in accordance with aspects of the present disclosure.

FIG. 9 shows a flowchart illustrating a method 900 that supports lens communication with multiple antenna arrays in accordance with aspects of the present disclosure. The operations of the method 900 may be implemented by a UE or a base station or its components as described herein. For example, the operations of the method 900 may be performed by a UE 115 or a base station 105 as described with reference to FIGS. 1 through 8. In some examples, a UE or a base station may execute a set of instructions to control the functional elements of the UE or the base station to perform the described functions. Additionally or alternatively, the UE or the base station may perform aspects of the described functions using special-purpose hardware.

At 905, the method may include transmitting, from a first antenna array of the first communications device, a first signal through a lens of the first communications device in a direction of a second communications device, an energy of a portion of the first signal being below a threshold, where a position of the portion of the first signal is based on a position of a second antenna array of the first communications device. The operations of 905 may be performed in accordance with examples as disclosed herein. In some examples, aspects of the operations of 905 may be performed by a transmission beam component 625 as described with reference to FIG. 6.

At 910, the method may include receiving, at the second antenna array and at least in part concurrently with transmitting the first signal, a second signal from a third communications device, the second signal being focused in a direction of the second antenna array based on the lens. The operations of 910 may be performed in accordance with examples as disclosed herein. In some examples, aspects of the operations of 910 may be performed by a reception beam component 630 as described with reference to FIG. 6.

Figure 10:
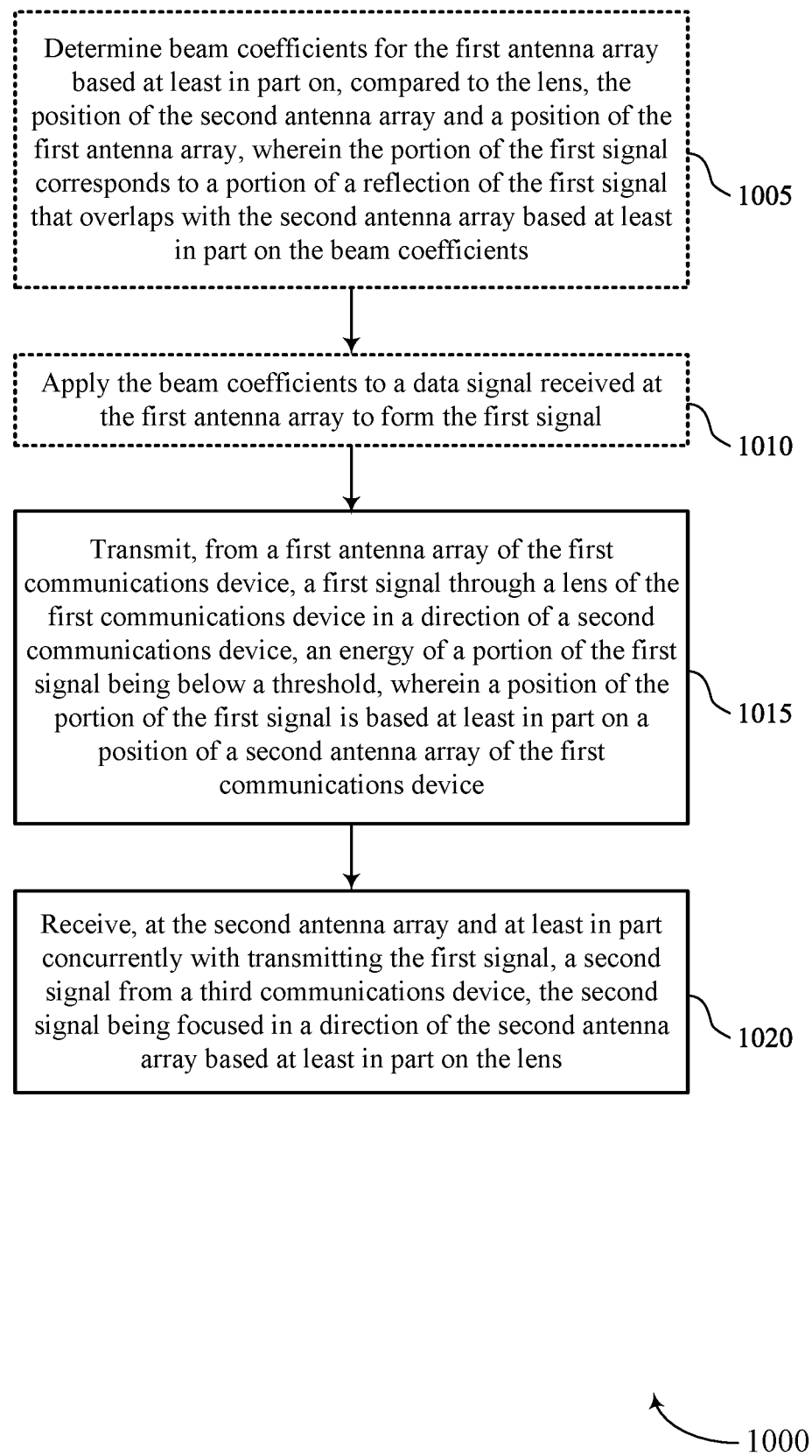

FIG. 10 shows a flowchart illustrating a method 1000 that supports lens communication with multiple antenna arrays in accordance with aspects of the present disclosure. The operations of the method 1000 may be implemented by a UE or a base station or its components as described herein. For example, the operations of the method 1000 may be performed by a UE 115 or a base station 105 as described with reference to FIGS. 1 through 8. In some examples, a UE or a base station may execute a set of instructions to control the functional elements of the UE or the base station to perform the described functions. Additionally or alternatively, the UE or the base station may perform aspects of the described functions using special-purpose hardware.

At 1005, the method may include determining beam coefficients for the first antenna array based on, compared to the lens, the position of the second antenna array and a position of the first antenna array, where the portion of the first signal corresponds to a portion of a reflection of the first signal that overlaps with the second antenna array based on the beam coefficients. The operations of 1005 may be performed in accordance with examples as disclosed herein. In some examples, aspects of the operations of 1005 may be performed by a transmission beam component 625 as described with reference to FIG. 6.

At 1010, the method may include applying the beam coefficients to a data signal received at the first antenna array to form the first signal. The operations of 1010 may be performed in accordance with examples as disclosed herein. In some examples, aspects of the operations of 1010 may be performed by a transmission beam component 625 as described with reference to FIG. 6.

At 1015, the method may the method may include transmitting, from a first antenna array of the first communications device, a first signal through a lens of the first communications device in a direction of a second communications device, an energy of a portion of the first signal being below a threshold, where a position of the portion of the first signal is based on a position of a second antenna array of the first communications device. The operations of 1005 may be performed in accordance with examples as disclosed herein. In some examples, aspects of the operations of 1015 may be performed by a transmission beam component 625 as described with reference to FIG. 6.

At 1020, the method may include the method may include receiving, at the second antenna array and at least in part concurrently with transmitting the first signal, a second signal from a third communications device, the second signal being focused in a direction of the second antenna array based on the lens. The operations of 1020 may be performed in accordance with examples as disclosed herein. In some examples, aspects of the operations of 1020 may be performed by a reception beam component 630 as described with reference to FIG. 6.

Figure 11:
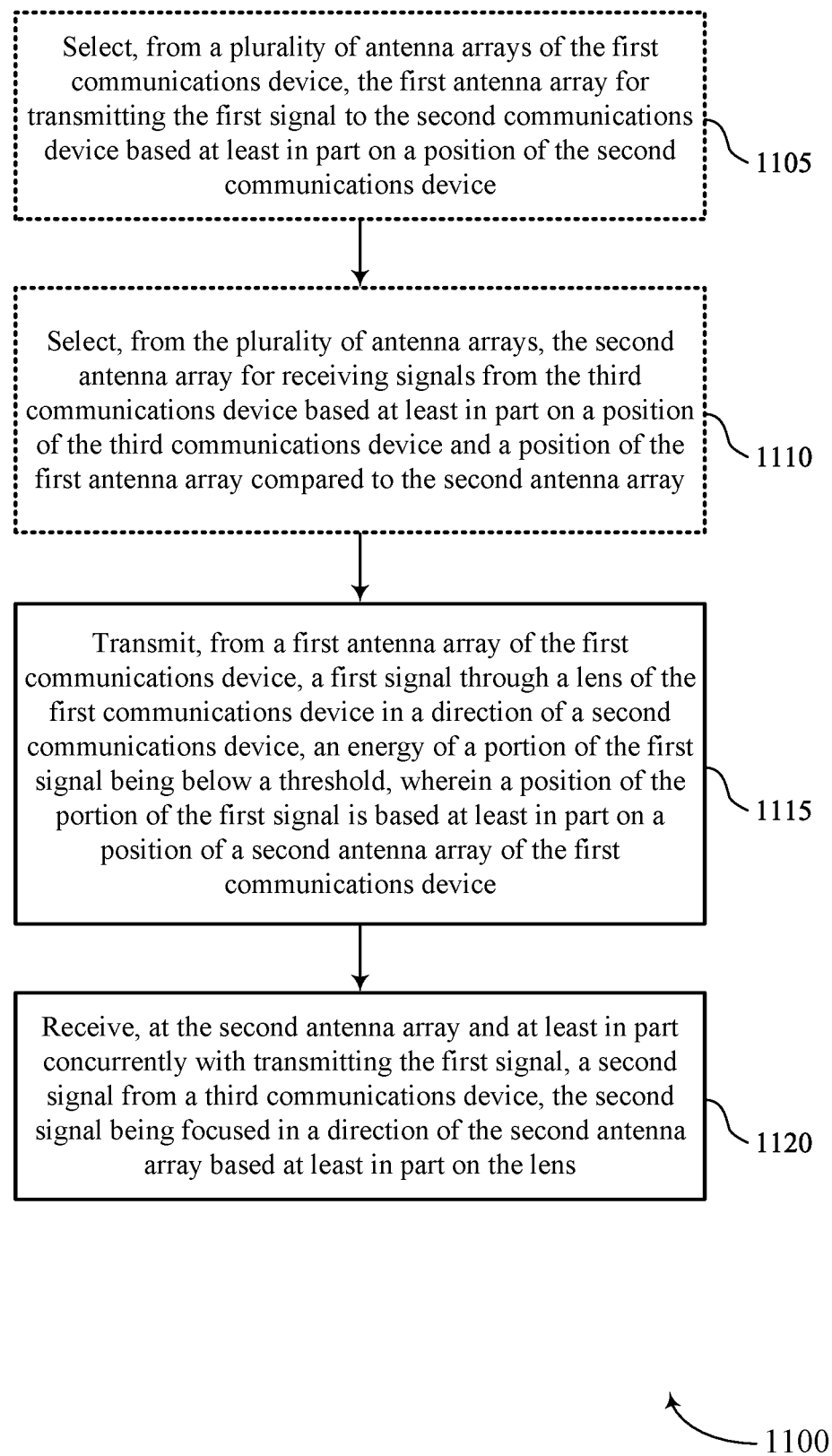

FIG. 11 shows a flowchart illustrating a method 1100 that supports lens communication with multiple antenna arrays in accordance with aspects of the present disclosure. The operations of the method 1100 may be implemented by a UE or a base station or its components as described herein. For example, the operations of the method 1100 may be performed by a UE 115 or a base station 105 as described with reference to FIGS. 1 through 8. In some examples, a UE or a base station may execute a set of instructions to control the functional elements of the UE or the base station to perform the described functions. Additionally or alternatively, the UE or the base station may perform aspects of the described functions using special-purpose hardware.

At 1105, the method may include selecting, from a set of multiple antenna arrays of the first communications device, the first antenna array for transmitting the first signal to the second communications device based on a position of the second communications device. The operations of 1105 may be performed in accordance with examples as disclosed herein. In some examples, aspects of the operations of 1105 may be performed by a transmission beam component 625 as described with reference to FIG. 6.

At 1110, the method may include selecting, from the set of multiple antenna arrays, the second antenna array for receiving signals from the third communications device based on a position of the third communications device and a position of the first antenna array compared to the second antenna array. The operations of 1110 may be performed in accordance with examples as disclosed herein. In some examples, aspects of the operations of 1110 may be performed by a reception beam component 630 as described with reference to FIG. 6.

At 1115, the method may include transmitting, from a first antenna array of the first communications device, a first signal through a lens of the first communications device in a direction of a second communications device, an energy of a portion of the first signal being below a threshold, where a position of the portion of the first signal is based on a position of a second antenna array of the first communications device. The operations of 1115 may be performed in accordance with examples as disclosed herein. In some examples, aspects of the operations of 1115 may be performed by a transmission beam component 625 as described with reference to FIG. 6.

At 1120, the method may include receiving, at the second antenna array and at least in part concurrently with transmitting the first signal, a second signal from a third communications device, the second signal being focused in a direction of the second antenna array based on the lens. The operations of 1120 may be performed in accordance with examples as disclosed herein. In some examples, aspects of the operations of 1120 may be performed by a reception beam component 630 as described with reference to FIG. 6.

The following provides an overview of aspects of the present disclosure:

Aspect 1: A method for wireless communication at a first communications device, comprising: transmitting, from a first antenna array of the first communications device, a first signal through a lens of the first communications device in a direction of a second communications device, an energy of a portion of the first signal being below a threshold, wherein a position of the portion of the first signal is based at least in part on a position of a second antenna array of the first communications device; and receiving, at the second antenna array and at least in part concurrently with transmitting the first signal, a second signal from a third communications device, the second signal being focused in a direction of the second antenna array based at least in part on the lens.

Aspect 2: The method of aspect 1, wherein a reflection of the first signal occurs based at least in part on transmitting the first signal through the lens, a portion of the reflection corresponding to the portion of the first signal and overlapping with the second antenna array, and an energy of the portion of the reflection being below a second threshold.

Aspect 3: The method of any of aspects 1 through 2, further comprising: determining beam coefficients for the first antenna array based at least in part on, compared to the lens, the position of the second antenna array and a position of the first antenna array, wherein the portion of the first signal corresponds to a portion of a reflection of the first signal that overlaps with the second antenna array based at least in part on the beam coefficients; and applying the beam coefficients to a data signal received at the first antenna array to form the first signal.

Aspect 4: The method of aspect 3, wherein determining the beam coefficients further comprises: determining the beam coefficients for the first antenna array based at least in part on a position of the second communications device, wherein the first signal is focused in the direction of the second communications device based at least in part on the beam coefficients and the lens.

Aspect 5: The method of any of aspects 1 through 4, further comprising: selecting, from a plurality of antenna arrays of the first communications device, the first antenna array for transmitting the first signal to the second communications device based at least in part on a position of the second communications device; and selecting, from the plurality of antenna arrays, the second antenna array for receiving signals from the third communications device based at least in part on a position of the third communications device and a position of the first antenna array compared to the second antenna array.

Aspect 6: The method of aspect 5, further comprising: disabling a subset of the plurality of antenna arrays based at least in part on the position of the second communications device and the third communications device.

Aspect 7: The method of any of aspects 1 through 6, further comprising: transmitting, from the first antenna array and a third antenna array of the first communications device, a third signal to a fourth communications device, wherein a mode associated with nulling a portion of transmissions from the first communications device is disabled based at least in part on, compared to the position of the second antenna array, a position of the third antenna array and a position of the first antenna array; establishing a connection with the second communications device; and activating the mode based at least in part on a position of the second communications device compared to the third communications device, the first signal being transmitted from the first antenna array based at least in part on activating the mode.

Aspect 8: The method of any of aspects 1 through 7, further comprising: determining beam coefficients for the second antenna array based at least in part on a reflection of the first signal, wherein the beam coefficients cancel interference caused by the reflection of the first signal; and applying the beam coefficients to the second signal received at the second antenna array.

Aspect 9: The method of any of aspects 1 through 8, wherein a distance between the lens and a plurality of antenna arrays of the first communications device is based at least in part on a wavelength of the first signal and a diameter of the plurality of antenna arrays, the plurality of antenna arrays comprising the first antenna array and the second antenna array.

Aspect 10: The method of aspect 9, wherein a diameter of the lens is greater than the diameter of the plurality of antenna arrays.

Aspect 11: The method of any of aspects 1 through 10, wherein a frequency of the first signal exceeds a frequency threshold associated with a distance between the first antenna array and the lens.

Aspect 12: An apparatus for wireless communication at a first communications device, comprising a processor and memory coupled to the processor; the processor and memory configured to perform a method of any of aspects 1 through 11.

Aspect 13: An apparatus for wireless communication at a first communications device, comprising at least one means for performing a method of any of aspects 1 through 11.

Aspect 14: A non-transitory computer-readable medium storing code for wireless communication at a first communications device, the code comprising instructions executable by a processor to perform a method of any of aspects 1 through 11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first communications device, comprising:
   one or more memories; and one or more processors coupled with the one or more memories and configured to cause the first communications device to:
  transmit, from a first antenna array, a first signal through a lens, wherein a reflection of the first signal overlaps with a second antenna array, an energy of the reflection is below a threshold in accordance with beam coefficients for the first antenna array; and
  receive, at the second antenna array and at least partially concurrent with transmitting the first signal, a second signal that is focused in a direction of the second antenna array.

2. The apparatus of claim 1, wherein the reflection of the first signal occurs based at least in part on transmitting the first signal through the lens, the reflection corresponds to a portion of the first signal, and an energy of the portion is below a second threshold.

3. The apparatus of claim 1, wherein the one or more processors are further configured to cause the first communications device to:
  determine the beam coefficients for the first antenna array based at least in part on a first position of the first antenna array and a second position of the second antenna array, wherein the reflection of the first signal overlaps with the second antenna array based at least in part on the beam coefficients; and
  apply the beam coefficients to a data signal received at the first antenna array to form the first signal.

4. The apparatus of claim 3, wherein the first signal is focused in the direction of a second communications device based at least in part on the beam coefficients.

5. The apparatus of claim 1, wherein the one or more processors are further configured to cause the first communications device to:
  select the first antenna array for transmitting the first signal to a second communications device based at least in part on a first position of the second communications device; and
  select the second antenna array for receiving signals from a third communications device based at least in part on a second position of the third communications device and a location of the first antenna array relative to the second antenna array.

6. The apparatus of claim 5, wherein the one or more processors are further configured to cause the first communications device to:
  disable a subset of a plurality of antenna arrays of the first communications device based at least in part on the first position of the second communications device and the second position of the third communications device.

7. The apparatus of claim 1, wherein the one or more processors are further configured to cause the first communications device to:
  transmit, from the first antenna array and a third antenna array, a third signal to a second communications device, wherein a mode associated with nulling a portion of transmissions from the first communications device is disabled based at least in part on a location of the third antenna array relative to the first antenna array;
  establish a connection with a third communications device; and
  activate the mode based at least in part on a first position of the second communications device and a second position of the third communications device, wherein the first signal is transmitted from the first antenna array based at least in part on activating the mode.

8. The apparatus of claim 1, wherein the one or more processors are further configured to cause the first communications device to:
  determine second beam coefficients for the second antenna array based at least in part on the reflection of the first signal; and
  apply the second beam coefficients to the second signal received at the second antenna array.

9. The apparatus of claim 1, wherein a distance between the lens and a plurality of antenna arrays of the first communications device is based at least in part on a wavelength of the first signal and a diameter of the plurality of antenna arrays, the plurality of antenna arrays comprising the first antenna array and the second antenna array.

10. The apparatus of claim 9, wherein a diameter of the lens is greater than the diameter of the plurality of antenna arrays.

11. The apparatus of claim 1, wherein a frequency of the first signal exceeds a frequency threshold associated with a distance between the first antenna array and the lens.

12. A method for wireless communication at a first communications device, comprising:
  transmitting, from a first antenna array, a first signal through a lens, wherein a reflection of the first signal overlaps with a second antenna array, an energy of the reflection being below a threshold in accordance with beam coefficients for the first antenna array; and
  receiving, at the second antenna array and at least partially concurrent with transmitting the first signal, a second signal that is focused in a direction of the second antenna array.

13. The method of claim 12, wherein the reflection of the first signal occurs based at least in part on transmitting the first signal through the lens, the reflection corresponding to a portion of the first signal, an energy of the portion being below a second threshold.

14. The method of claim 12, further comprising:
  determining the beam coefficients for the first antenna array based at least in part on a first position of the first antenna array and a second position of the second antenna array, wherein the reflection of the first signal overlaps with the second antenna array based at least in part on the beam coefficients; and
  applying the beam coefficients to a data signal received at the first antenna array to form the first signal.

15. The method of claim 14, wherein the first signal is focused in the direction of a second communications device based at least in part on the beam coefficients.

16. The method of claim 12, further comprising:
  selecting the first antenna array for transmitting the first signal to a second communications device based at least in part on a first position of the second communications device; and
  selecting the second antenna array for receiving signals from a third communications device based at least in part on a second position of the third communications device and a location of the first antenna array relative to the second antenna array.

17. The method of claim 16, further comprising:
  disabling a subset of a plurality of antenna arrays of the first communications device based at least in part on the first position of the second communications device and the second position of the third communications device.

18. The method of claim 12, further comprising:
  transmitting, from the first antenna array and a third antenna array, a third signal to a second communications device, wherein a mode associated with nulling a portion of transmissions from the first communications device is disabled based at least in part on a location of the third antenna array relative to the first antenna array;
establishing a connection with a third communications device; and
activating the mode based at least in part on a first position of the second communications device and a second position of the third communications device, the first signal being transmitted from the first antenna array based at least in part on activating the mode.

19. The method of claim 12, further comprising:
determining second beam coefficients for the second antenna array based at least in part on the reflection of the first signal; and
applying the second beam coefficients to the second signal received at the second antenna array.

20. The method of claim 12, wherein a distance between the lens and a plurality of antenna arrays of the first communications device is based at least in part on a wavelength of the first signal and a diameter of the plurality of antenna arrays, the plurality of antenna arrays comprising the first antenna array and the second antenna array.

21. The method of claim 20, wherein a diameter of the lens is greater than the diameter of the plurality of antenna arrays.

22. The method of claim 12, wherein a frequency of the first signal exceeds a frequency threshold associated with a distance between the first antenna array and the lens.

23. A non-transitory computer-readable medium storing code for wireless communication at a first communications device, the code comprising instructions executable by one or more processors to:
transmit, from a first antenna array, a first signal through a lens, wherein a reflection of the first signal overlaps with a second antenna array, an energy of the reflection being below a threshold in accordance with beam coefficients for the first antenna array; and
receive, at the second antenna array and at least partially concurrent with transmitting the first signal, a second signal that is focused in a direction of the second antenna array.

24. The non-transitory computer-readable medium of claim 23, wherein
the reflection of the first signal occurs based at least in part on transmitting the first signal through the lens, the reflection corresponding to a portion of the first signal, an energy of the portion being below a second threshold.

25. The non-transitory computer-readable medium of claim 23, wherein the instructions are further executable by the one or more processors to:
determine the beam coefficients for the first antenna array based at least in part on a first position of the first antenna array and a second position of the second antenna array, wherein the reflection of the first signal overlaps with the second antenna array based at least in part on the beam coefficients; and
apply the beam coefficients to a data signal received at the first antenna array to form the first signal.

26. The non-transitory computer-readable medium of claim 25, wherein the first signal is focused in the direction of a second communications device based at least in part on the beam coefficients.

27. An apparatus for wireless communication at a first communications device, comprising:
means for transmitting, from a first antenna array, a first signal through a lens, wherein a reflection of the first signal overlaps with a second antenna array, an energy of the reflection being below a threshold in accordance with beam coefficients for the first antenna array; and
means for receiving, at the second antenna array and at least partially concurrent with transmitting the first signal, a second signal that is focused in a direction of the second antenna array.

28. The apparatus of claim 27, wherein the reflection of the first signal occurs based at least in part on transmitting the first signal through the lens, the reflection corresponding to a portion of the first signal, an energy of the portion being below a second threshold.

29. The apparatus of claim 27, further comprising:
means for determining the beam coefficients for the first antenna array based at least in part on a first position of the first antenna array and a second position of the second antenna array, wherein the reflection of the first signal overlaps with the second antenna array based at least in part on the beam coefficients; and
means for applying the beam coefficients to a data signal received at the first antenna array to form the first signal.

30. The apparatus of claim 29, wherein the first signal is focused in the direction of a second communications device based at least in part on the beam coefficients.

* * * * *